US011190874B2

United States Patent
Yokoyama et al.

(10) Patent No.: US 11,190,874 B2
(45) Date of Patent: Nov. 30, 2021

(54) INFORMATION PROCESSING DEVICE AND INFORMATION PROCESSING METHOD

(71) Applicant: SONY CORPORATION, Tokyo (JP)

(72) Inventors: Ryo Yokoyama, Tokyo (JP); Osamu Ito, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/628,089

(22) PCT Filed: Jul. 3, 2018

(86) PCT No.: PCT/JP2018/025277
§ 371 (c)(1),
(2) Date: Jan. 2, 2020

(87) PCT Pub. No.: WO2019/013056
PCT Pub. Date: Jan. 17, 2019

(65) Prior Publication Data
US 2021/0152931 A1 May 20, 2021

Related U.S. Application Data

(60) Provisional application No. 62/534,879, filed on Jul. 20, 2017, provisional application No. 62/530,455, filed on Jul. 10, 2017.

(51) Int. Cl.
*H04R 3/00* (2006.01)
*G06F 3/01* (2006.01)
(Continued)

(52) U.S. Cl.
CPC ............... *H04R 3/02* (2013.01); *H04R 1/028* (2013.01); *H04R 3/002* (2013.01); *G06F 3/016* (2013.01); *H04R 2400/03* (2013.01)

(58) Field of Classification Search
CPC .......... H04R 3/00; H04R 3/002; H04R 3/005; H04R 3/02; H04R 3/04; H04R 3/12;
(Continued)

(56) References Cited

U.S. PATENT DOCUMENTS 4,860,361 A 8/1989 Sato et al.
5,553,148 A 9/1996 Werle
(Continued)

FOREIGN PATENT DOCUMENTS

CA 2170382 A 1/1996
CN 101828382 A 9/2010
(Continued)

OTHER PUBLICATIONS

Extended European Search Report of EP Application No. 18831773.9, dated Apr. 30, 2020, 09 pages of EESR.
(Continued)

*Primary Examiner* — Thang V Tran
(74) *Attorney, Agent, or Firm* — Chip Law Group

(57) ABSTRACT

[Object] To prevent appropriately that a user perceives sound emitted by a tactile stimulus (second sound). [Solving Means] To provide an information processing device including a generation section that generates, on the basis of information regarding a first perception characteristic of a user with respect to a first sound emitted from an acoustic presentation section and information regarding a second perception characteristic of the user with respect to a second sound emitted by a tactile stimulus presented from a tactile data presentation section, tactile data to be used for presentation of the tactile stimulus of emitting the second sound that is not perceived by the user.

8 Claims, 16 Drawing Sheets

(51) Int. Cl.
  *H04R 3/02* (2006.01)
  *H04R 1/02* (2006.01)
(58) Field of Classification Search
  CPC ............... H04R 1/028; H04R 2400/03; H04R 2201/023; H04R 2410/05; H04R 2430/01; H06F 3/01; H06F 3/016; H06F 3/041; H06F 3/0414; H06F 3/0488; H06F 3/0487
  See application file for complete search history.

(56) References Cited

U.S. PATENT DOCUMENTS

| | | | |
|---|---|---|---|
| 6,001,072 A | 12/1999 | Fujiwara | |
| 9,886,091 B2* | 2/2018 | Yliaho | G06F 3/016 |
| 10,649,529 B1* | 5/2020 | Nekimken | G06F 3/03547 |
| 10,713,908 B2* | 7/2020 | Yokoyama | H04W 4/06 |
| 10,739,856 B2* | 8/2020 | Yokoyama | G06F 3/016 |
| 2010/0217413 A1 | 8/2010 | Seiler | |
| 2011/0063208 A1 | 3/2011 | Van Den Eerenbeemd et al. | |
| 2011/0080098 A1 | 4/2011 | Harris | |
| 2011/0080273 A1* | 4/2011 | Kawai | G06F 3/016 340/407.1 |
| 2014/0232269 A1 | 8/2014 | Harris | |
| 2014/0266644 A1 | 9/2014 | Heubel | |
| 2015/0273322 A1* | 10/2015 | Nakagawa | G06F 3/016 463/37 |
| 2015/0300620 A1 | 10/2015 | Harris | |
| 2015/0325090 A1 | 11/2015 | Heubel | |
| 2016/0027264 A1* | 1/2016 | Choi | G08B 6/00 340/407.1 |
| 2016/0234662 A1 | 8/2016 | Heubel | |
| 2016/0337754 A1 | 11/2016 | Seiler | |
| 2016/0356478 A1 | 12/2016 | Harris | |
| 2018/0033263 A1* | 2/2018 | Novich | G10H 3/26 |
| 2018/0332394 A1 | 11/2018 | Seiler | |
| 2019/0196596 A1* | 6/2019 | Yokoyama | A63F 13/25 |
| 2019/0279472 A1 | 9/2019 | Ito et al. | |

FOREIGN PATENT DOCUMENTS

| | | |
|---|---|---|
| CN | 102016759 A | 4/2011 |
| CN | 104049735 A | 9/2014 |
| CN | 106774891 A | 5/2017 |
| CN | 109582135 A | 4/2019 |
| CN | 109792568 A | 5/2019 |
| DE | 102013214201 A1 | 1/2015 |
| EP | 0722260 A1 | 7/1996 |
| EP | 2779706 A1 | 9/2014 |
| EP | 3270614 A1 | 1/2018 |
| EP | 3525477 A1 | 8/2019 |
| JP | 64-042599 U | 3/1989 |
| JP | 08-019078 A | 1/1996 |
| JP | 2004-233463 A | 8/2004 |
| JP | 2006-222826 A | 8/2006 |
| JP | 2011-523364 A | 8/2011 |
| JP | 2018-060313 A | 4/2018 |
| JP | 6426356 B2 | 11/2018 |
| JP | 6576538 B2 | 9/2019 |
| KR | 10-2011-0008316 A | 1/2011 |
| KR | 10-2014-0113390 A | 9/2014 |
| WO | 96/001031 A1 | 1/1996 |
| WO | 2008/117002 A1 | 10/2008 |
| WO | 2009/136345 A1 | 11/2009 |
| WO | 2010/093913 A1 | 8/2010 |
| WO | 2018/066354 A1 | 4/2018 |

OTHER PUBLICATIONS

Extended European Search Report of EP Application No. 18832751.4, dated Apr. 29, 2020, 10 pages of EESR.

International Search Report and Written Opinion of PCT Application No. PCT/JP2018/025277, dated Aug. 28, 2018, 06 pages of ISRWO.

Non-Final Office Action for U.S. Appl. No. 16/628,082, dated Apr. 21, 2021, 11 pages.

Non-Final Office Action for CN Patent Application No. 201880045075.8, dated Apr. 22, 2021, 11 pages.

Office Action for CN Patent Application No. 201880045075.8, dated Apr. 22, 2021, 05 pages of English Translation and 03 pages of Office Action.

* cited by examiner

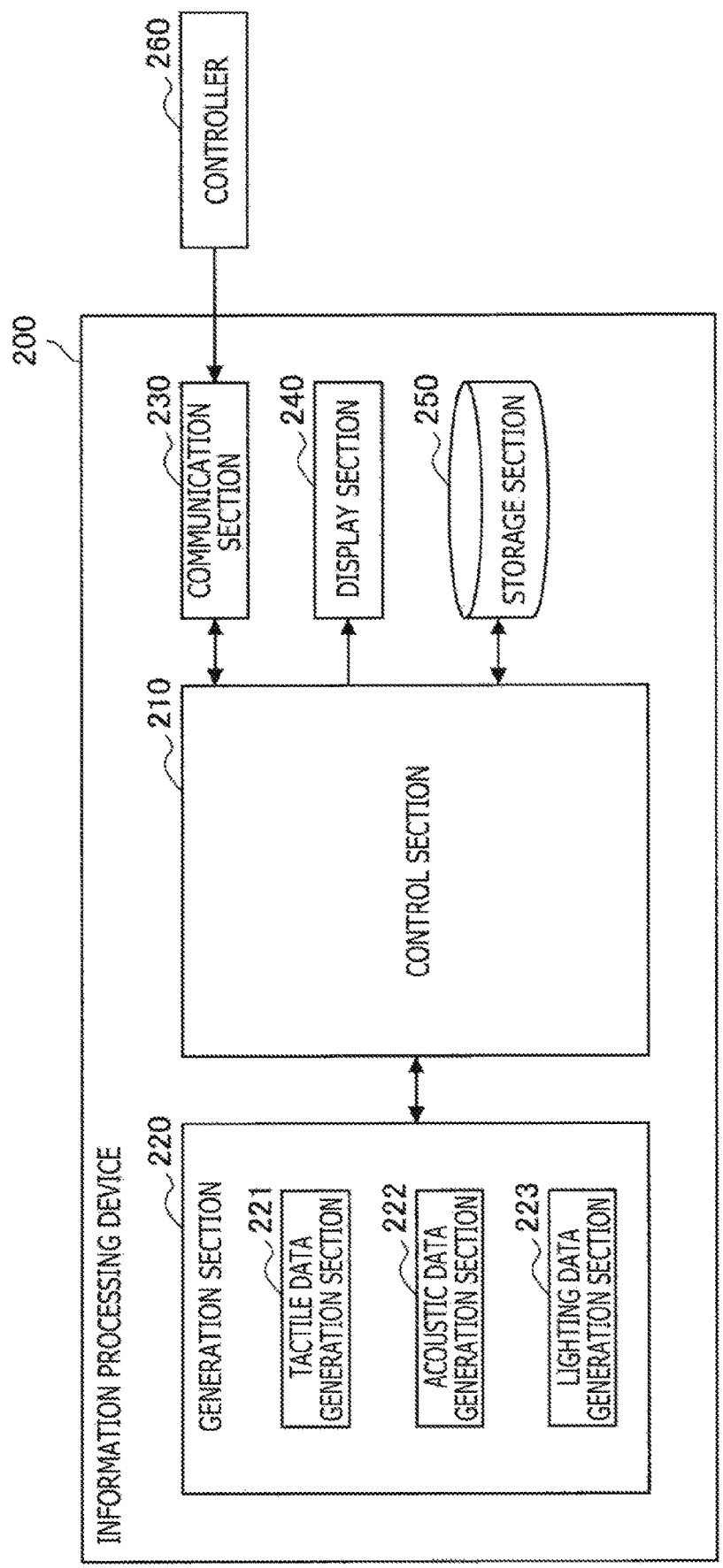

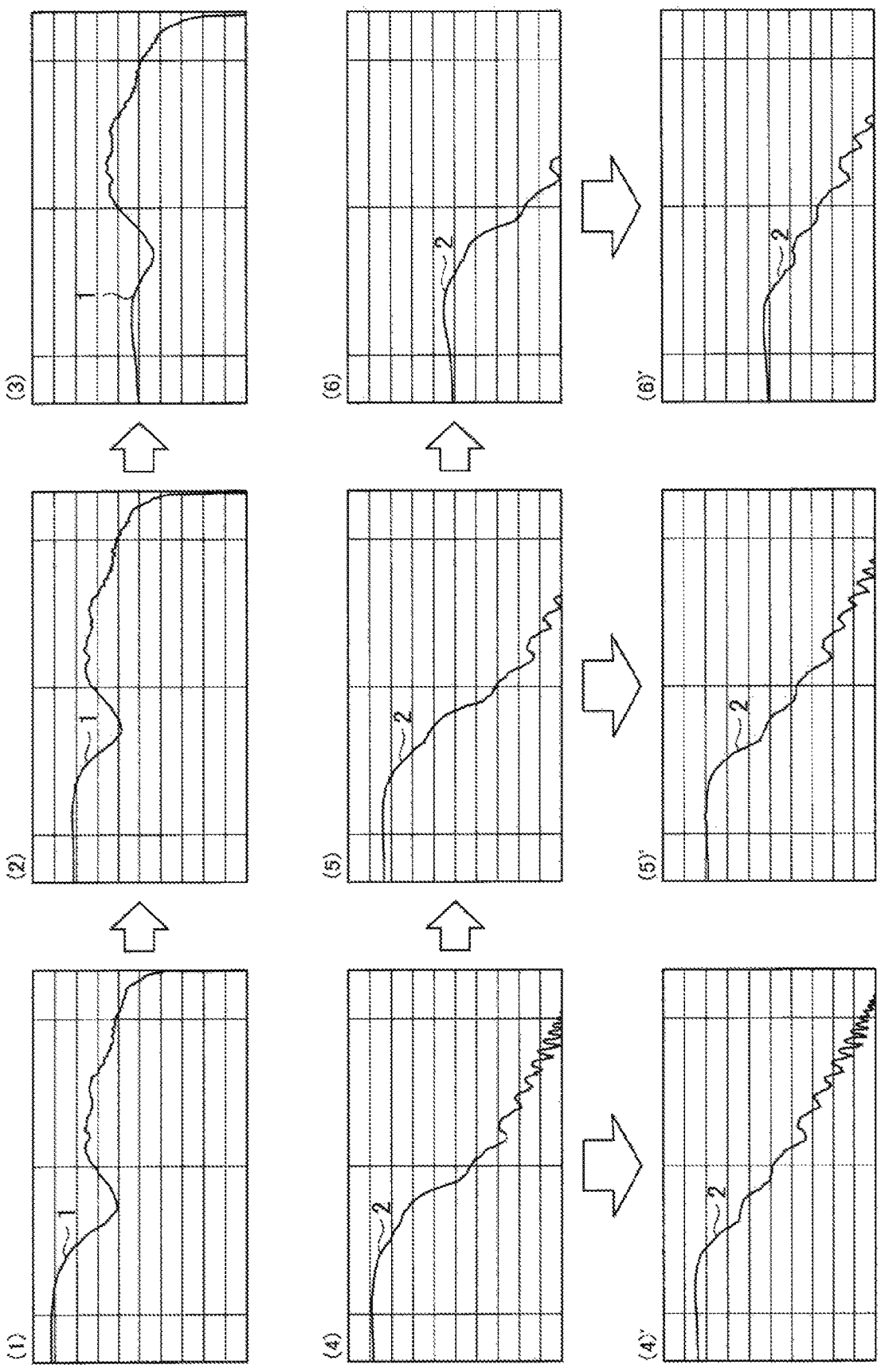

FIG.12
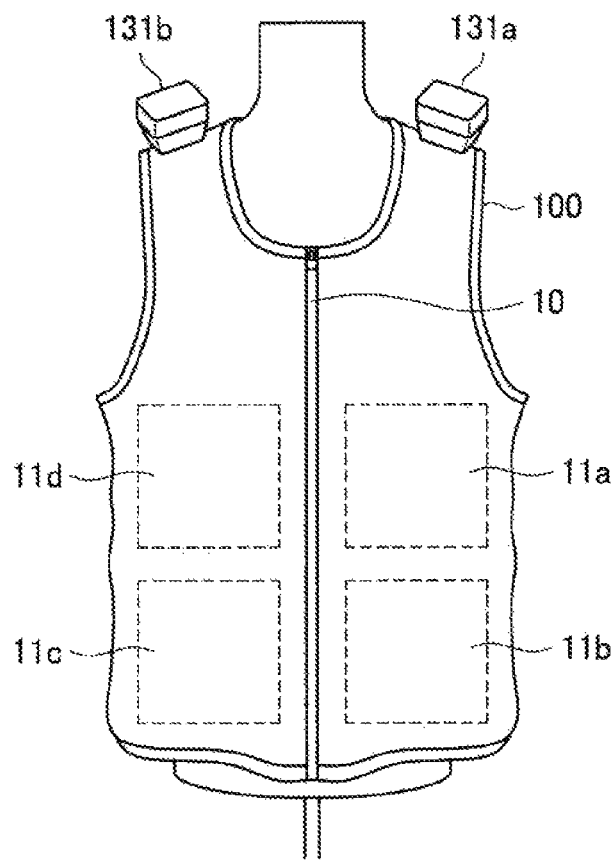
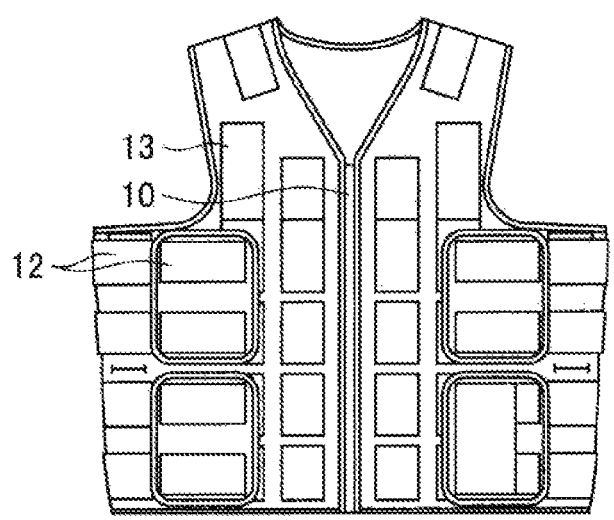
FIG. 13A
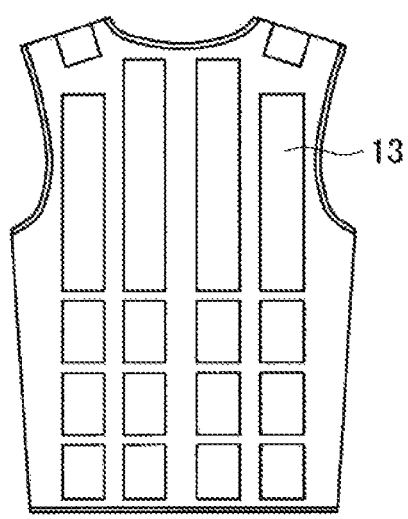
FIG. 13B

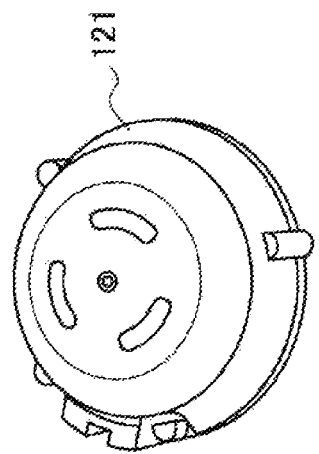
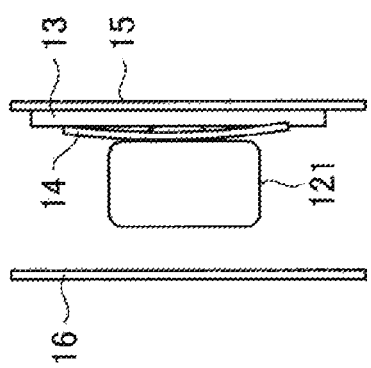
FIG. 14A
FIG. 14B

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/025277 filed on Jul. 3, 2018, which claims priority benefit of U.S. Patent Application No. 62/534,879 filed in the US Patent Office on Jul. 20, 2017 and also claims priority benefit of U.S. Patent Application No. 62/530,455 filed in the US Patent Office on Jul. 10, 2017. Each of the above-referenced applications is hereby incorporated herein by reference in its entirety.

TECHNICAL FIELD

The present disclosure relates to an information processing device, an information processing method, and a program.

BACKGROUND ART

In the past, various technologies for presenting a tactile stimulus or the like to a user have been proposed, for example, as in PTL 1 specified below.

CITATION LIST

Patent Literature

[PTL 1]
JP 2018-60313A

SUMMARY

Technical Problem

Here, for example, together with provision of various types of content including theatrics, a movie, a concert, a live and so forth, staging in which a tactile stimulus is presented from a tactile data presentation section including an actuator and so forth to a user to improve the presence or the like. At this time, there is the possibility that the user may perceive sound emitted by a tactile stimulus (second sound) and feel uncomfortable. Depending upon the technology disclosed in PTL 1 specified above, it cannot be prevented appropriately that the user perceives sound emitted by a tactile stimulus (second sound).

Therefore, the present disclosure proposes a novel and improved information processing device, information processing method, and program that can appropriately prevent sound emitted by a tactile stimulus (second sound) from being perceived by a user.

Solution to Problem

According to the present disclosure, there is provided an information processing device including a generation section that generates, on the basis of information regarding a first perception characteristic of a user with respect to a first sound emitted from an acoustic presentation section and information regarding a second perception characteristic of the user with respect to a second sound emitted by a tactile stimulus presented from a tactile data presentation section, tactile data to be used for presentation of the tactile stimulus of emitting the second sound that is not perceived by the user.

Further, according to the present disclosure, there is provided an information processing method executed by a computer, the method including generating, on the basis of information regarding a first perception characteristic of a user with respect to a first sound emitted from an acoustic presentation section and information regarding a second perception characteristic of the user with respect to a second sound emitted by a tactile stimulus presented from a tactile data presentation section, tactile data to be used for presentation of the tactile stimulus of emitting the second sound that is not perceived by the user.

Further, according to the present disclosure, there is provided a program for causing a computer to implement generating, on the basis of information regarding a first perception characteristic of a user with respect to a first sound emitted from an acoustic presentation section and information regarding a second perception characteristic of the user with respect to a second sound emitted by a tactile stimulus presented from a tactile data presentation section, tactile data to be used for presentation of the tactile stimulus of emitting the second sound that is not perceived by the user.

Advantageous Effect of Invention

As described above, with the present disclosure, it is possible to prevent appropriately that a user perceives sound emitted by a tactile stimulus (second sound).

It is to be noted that the effect described above is not necessarily restrictive and some effect described in the present specification or other effects capable of being grasped from the present specification may be exhibited together with or in place of the effect described above.

BRIEF DESCRIPTION OF DRAWINGS

FIG. 6 is a block diagram depicting an example of a functional configuration of an information processing device 200.

FIG. 7 is a view illustrating a method for generating tactile data such that second sound is not perceived by a user.

FIG. 12 is a view illustrating an outer vest.

FIGS. 13A and 13B are view illustrating an inner vest.

FIGS. 14A and 14B are view illustrating a fixation mode of a tactile data presentation section 121.

DESCRIPTION OF EMBODIMENT

In the following, a preferred embodiment of the present disclosure is described with reference to the accompanying drawings. It is to be noted that, in the present specification and the drawings, configurations having substantially same functional configurations are denoted by like reference symbols and overlapping description of them is omitted.

Further, the description is given in the following order.
1. Overview of Information Processing System
2. Example of Functional Configuration of Device
3. Example of Processing Flow of Device
4. Example of Hardware Configuration
5. Remarks

1. OVERVIEW OF INFORMATION PROCESSING SYSTEM

First, an overview of an information processing system according to the present disclosure is described.

The information processing system according to the present disclosure presents various sensations to a user. Describing more particularly, as depicted in FIG. 1, the information processing system includes a sensation presentation device 100 that is worn by a user and presents various sensations to the user through the sensation presentation device 100.

Figure 1:
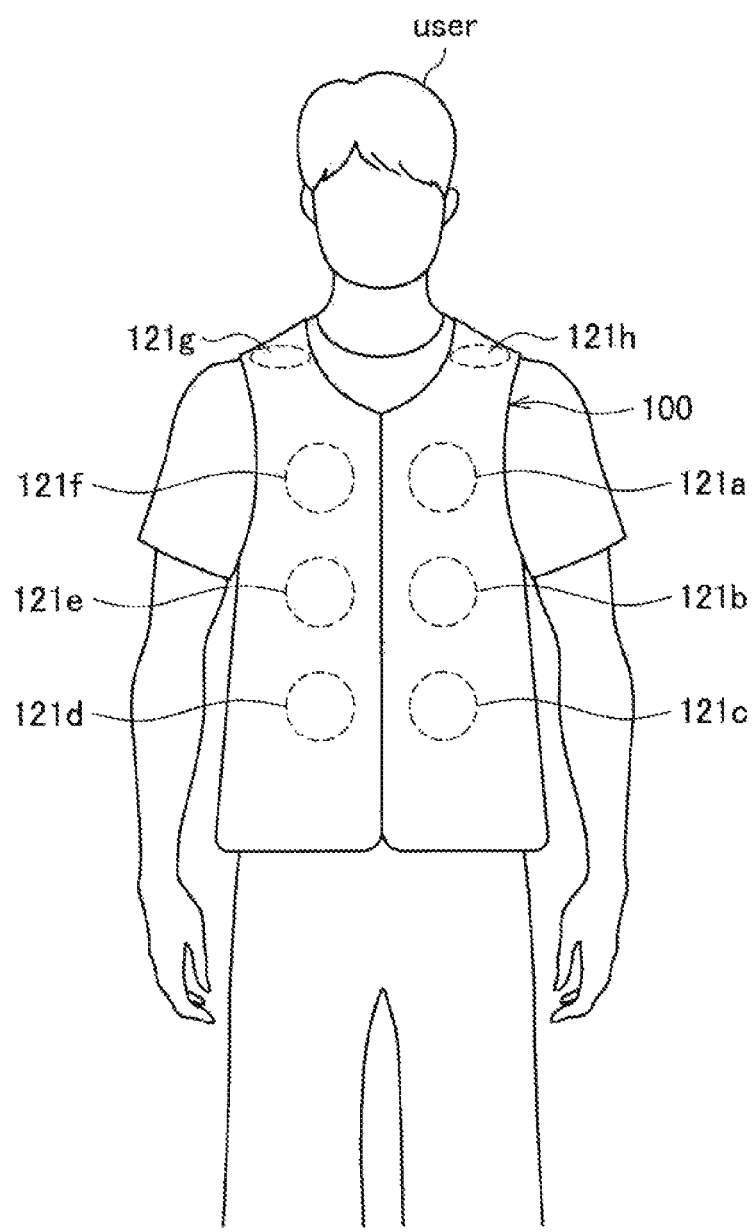
FIG. 1 is a view depicting a particular example of a sensation presentation device 100.

As depicted in FIG. 1, the sensation presentation device 100 includes a plurality of tactile data presentation sections 121 (in FIG. 1, a tactile data presentation section 121a to a tactile data presentation section 121h) provided in the inside thereof. For example, in the inside of the sensation presentation device 100, on a front side of the user, a plurality of tactile data presentation sections 121 (for example, as depicted in FIG. 1, six tactile data presentation sections 121 (tactile data presentation section 121a to tactile data presentation section 121f)) can be deployed; in a shoulder region, a plurality of tactile data presentation sections 121 (for example, as depicted in FIG. 1, one tactile data presentation section 121 on each shoulder (tactile data presentation section 121g and tactile data presentation section 121h)) can be deployed; and on a rear side, a plurality of tactile data presentation sections 121 (not depicted; for example, six tactile data presentation sections 121 similar to those on the front side) can be deployed. As an example, the individual tactile data presentation sections 121 can be deployed in such a positional relationship that the individual tactile data presentation sections 121 deployed on the front side and the individual tactile data presentation sections 121 deployed on the rear side are opposed to each other.

The sensation presentation device 100 includes one or more tactile data presentation sections 121 and can present various tactile stimuli to a user by controlling the magnitude and the timing of outputting of them or a combination of the tactile data presentation sections 121 to be used for outputting. For example, the sensation presentation device 100 can present a sensation that the user is cut, a sensation that the user hits some object, a sensation that the user is held down and so forth. It is to be noted that, while FIG. 1 depicts an example in which the sensation presentation device 100 is a sleeveless garment (vest), the sensation presentation device 100 is not limited to such example and may be able to present a sensation to various regions of the body where it has sleeves, trousers or the like. Further, the number of tactile data presentation sections 121 provided on the sensation presentation device 100 is not limited especially.

Figure 2:
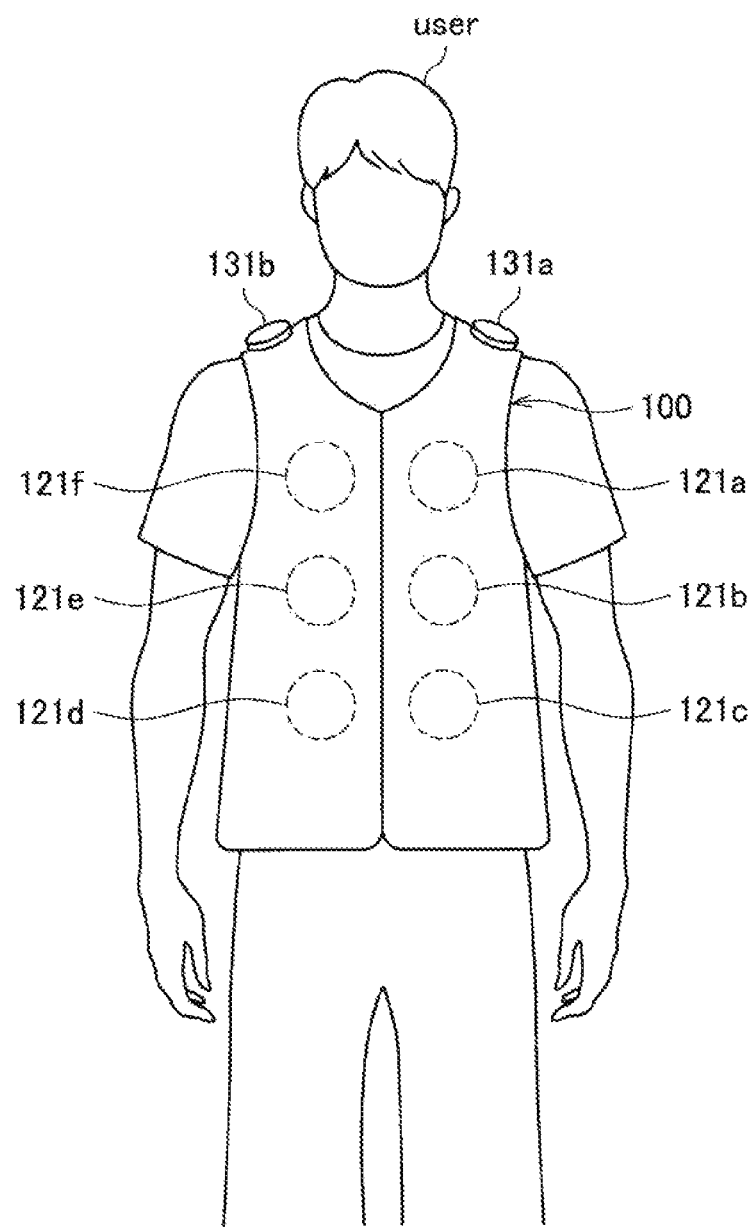
FIG. 2 is a view depicting another particular example of the sensation presentation device 100.

Further, as depicted in FIG. 2, the sensation presentation device 100 may include an acoustic data presentation section 131 that presents sound (in FIG. 2, an acoustic data presentation section 131a and another acoustic data presentation section 131b). For example, in the sensation presentation device 100, a plurality of (for example, one on each shoulder as depicted in FIG. 2) acoustic data presentation sections 131 can be deployed in the shoulder region of the user.

The sensation presentation device 100 includes one or more acoustic data presentation sections 131 and can present various acoustic effects to the user by controlling the magnitude and the timing of an output of them. For example, the sensation presentation device 100 can localize a sound image in the space and can present sound effect only to the user in a situation in which BGM is presented from another speaker (for example, sound effect when the user is cut, sound effect when the user hits some object or the like). It is to be noted that the number of acoustic data presentation sections 131 provided in the sensation presentation device 100 is not limited specifically.

Here, while the examples of FIGS. 1 and 2 depict an example in which sensations to be presented to the user by the sensation presentation device 100 include the tactile (a tactile stimulus presented by the tactile data presentation section 121) and the auditory (sound presented by the acoustic data presentation section 131), the sensations to be presented to the user are not limited to them. More particularly, the sensation presentation device 100 may include a mechanism that can present the visual, olfactory, or taste. For example, the sensation presentation device 100 may be able to present the visual (video) like a transmission type head-mounted display or the like or may present the olfactory (smell) like a fragrance presentation device or the like or else may present the taste (flavor) like an electric taste presentation device.

Figure 3:
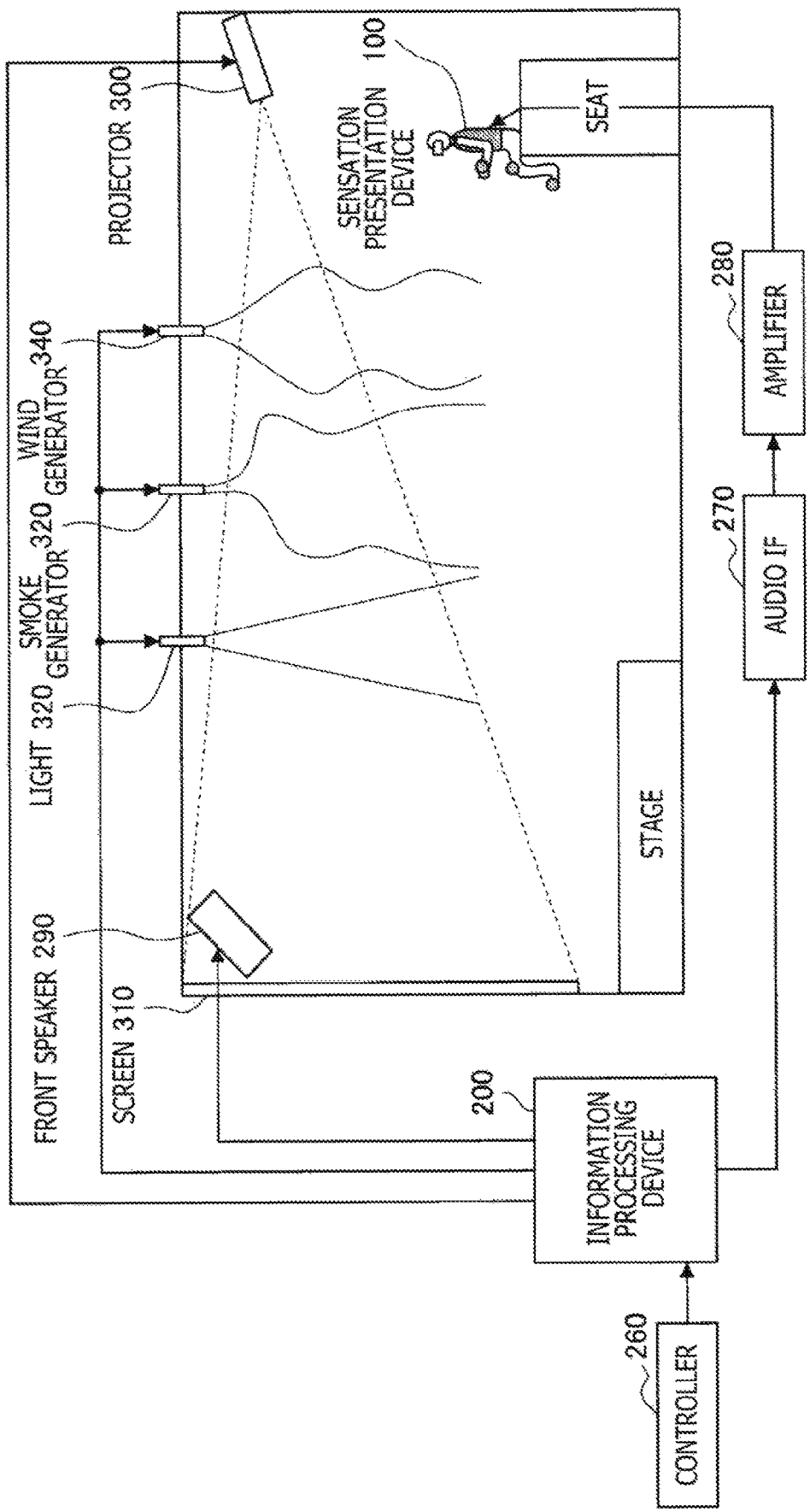
FIG. 3 is a view depicting an example of a configuration of an information processing system according to the present disclosure.

Now, an example of a configuration of an entire system including the sensation presentation device 100 is described with reference to FIG. 3. The information processing system according to the present disclosure is a system that can be utilized, for example, regardless of the indoor (for example, a playhouse, a movie theater, a concert hall, a live house, indoor play facilities in a theme park and so forth) or the outdoor (for example, a playhouse whose stage is provided outdoors, a concert venue or a live venue, a movie screening venue whose screen is provided outdoors, outdoor play facilities in a theme park and so forth). Further, as depicted in FIG. 3, the information processing system according to the present disclosure includes a sensation presentation device 100, an information processing device 200, a controller 260, an audio IF 270, an amplifier 280, a front speaker 290, a projector 300, a screen 310, a light 320, a smoke generator 330, and a wind generator 340 (it is to be noted that the information processing system depicted in FIG. 3 assumes a case in which it is utilized indoors).

A user would wear the sensation presentation device 100 and sit on a seat in a mode in which it can view the screen 310 or a stage. The information processing device 200 is a device that generally controls the entire information processing system. More particularly, the information processing device 200 generally controls a sensation to be presented to a user through the sensation presentation device 100, a video to be projected to the screen 310, a sound to be emitted from the front speaker 290, a light to be irradiated from the light 320, a smoke to be generated from the smoke generator 330, a wind to be generated from the wind generator 340 and so forth. Functions of the information processing device 200 are hereinafter described in detail. The controller 260 is a device that is used when an operator performs inputting to the information processing device 200.

The audio IF 270 is a device that functions as an interface of acoustic data that is used for presentation of sound through the sensation presentation device 100. The amplifier 280 is a device that performs amplification or adjustment of acoustic data inputted to the audio IF 270, switching of an input and so forth. The front speaker 290 is a device that functions as an acoustic presentation section and is a device that presents sound (first sound) to the overall venue.

The projector 300 is a device that projects a video to the screen 310, and the screen 310 is a face (for example, a flat face or a curved face) to which a video is projected. The light 320, the smoke generator 330, and the wind generator 340 are devices that present light, smoke, and wind, respectively.

An example of a configuration of the information processing system according to the present disclosure has been described. It is to be noted that the configuration described above with reference to FIG. 3 is an example to the last, and the configuration of the information processing system according to the present disclosure is not limited to such an example as described above. The configuration of the information processing system according to the present disclosure can be modified flexibly in accordance with specifications or practical use.

Here, in the case where a tactile stimulus is presented from the tactile data presentation section 121 of the sensation presentation device 100 to the user together with provision of various types of content including theatrics, a movie, a concert, a live and so forth as in the information processing system according to the present disclosure, there is the possibility that the user may feel uncomfortable by perceiving sound (second sound) emitted by the tactile stimulus. More particularly, where the sound (second sound) emitted by the tactile stimulus is perceived as noise by the user, it becomes harder for the user to hear sound (first sound) presented from the front speaker 290 or the presence is disturbed. Further, there is the possibility that not only a user to whom a tactile stimulus is presented but also a user to whom the tactile stimulus is not presented (user who does not wear the sensation presentation device 100) may feel uncomfortable similarly as in the case described above by perceiving sound (second sound) emitted by a tactile stimulus presented to another person located in the neighborhood.

The discloser of the present case has come to create the technology of the present disclosure taking the circumstances described above into consideration. The information processing device 200 according to the present disclosure generates tactile data to be used for presentation of a tactile stimulus in which second sound that is not perceived by a user is emitted on the basis of information regarding a first perception characteristic of the user with respect to a first sound emitted from the front speaker 290 (acoustic presentation section) (such information is hereinafter referred to as "first perception characteristic information") and information regarding a second perception characteristic of the user with respect to a second sound emitted by a tactile stimulus presented from the tactile data presentation section 121 of the sensation presentation device 100 (such information is hereinafter referred to as "second perception characteristic information").

Here, the "first perception characteristic information" is information indicative of whether or not first sound is perceived by the user, a degree of the perception or the like and includes frequency characteristic information of the first sound when the first sound reaches an ear of the user. Meanwhile, the "second perception characteristic information" is information indicative of whether or not second sound is perceived by the user, a degree of such perception or the like and includes frequency characteristic of the second sound when the second sound reaches an ear of the user. Particular examples of the first perception characteristic information and the second perception characteristic information are hereinafter described. Further, although it is described in the foregoing description that the first sound is sound emitted from the front speaker 290, the first sound is not limited to this. For example, the first sound includes also sound emitted from the acoustic data presentation section 131 of the sensation presentation device 100 and further includes, in the case where an arbitrary speaker other than the front speaker 290 and the acoustic data presentation section 131 exists, also sound emitted from the speaker.

Then, the information processing device 200 provides tactile data generated in such a manner to the sensation presentation device 100 such that the tactile data presentation section 121 of the sensation presentation device 100 can use the tactile data to present a tactile stimulus of emitting second sound that is not perceived by users. Therefore, a user to whom the tactile stimulus is presented and another user who is located in the neighborhood of the user and to whom the tactile stimulus is not presented can be prevented from perceiving the second sound and feeling uncomfortable. In particular, it is to be noted that the "user" in the present specification is a concept that includes not only a user to whom a tactile stimulus is presented but also a user to whom a tactile stimulus is not presented.

Describing a generation method of tactile data, the information processing device 200 generates tactile data by adjusting the ratio of first sound and second sound that are to reach an ear of a user on the basis of first perception characteristic information and second perception characteristic information. For example, the information processing device 200 adjusts the ratio for each frequency band to generate tactile data. Here, the "ratio between first sound and second sound" may be represented as SN ratio (Signal-Noise ratio) (it is to be noted that this does not limited to the S/N ratio). In such a case, "S (Signal)" represents a signal of a first sound presented from the front speaker 290, and "N (Noise)" represents a signal of a second sound emitted by a tactile stimulus. For example, the information processing device 200 adjusts the ratio between first sound and second sound (SN ratio) in advance or adjust the ratio on the real time basis on the basis of first perception characteristic information and second perception characteristic information.

Describing an adjustment method of the ratio between first sound and second sound (SN ratio) more particularly, for example, the information processing device 200 can generate tactile data such that the sound pressure level of the second sound is lower than the sound pressure level of the first sound in the audible range of a user (in other words, in outside of the audible range of a user, the information processing device 200 may not be made the sound pressure level of the second sound lower than the sound pressure level of the first sound).

Figure 4A:
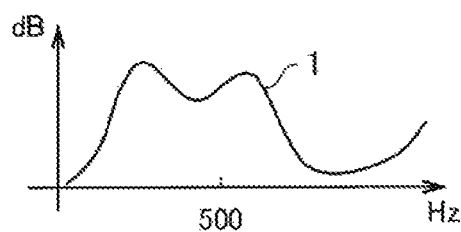
FIGS. 4A and 4B are view illustrating a method for generating tactile data such that second sound is not perceived by a user.

For example, a case is considered in which the frequency characteristic information, included in the first perception characteristic information, of the first sound when the first sound reaches an ear of a user has such a waveform 1 as depicted in FIG. 4A. Thus, the information processing device 200 adjusts, for each frequency band in outside of the audible range of a user, the sound pressure level of the second sound so as to be lower than the sound pressure level of the first sound (a waveform 2 in FIG. 4B indicates the sound pressure level of the second sound). This makes it possible for the information processing device 200 to prevent the second sound from being perceived by the user.

Further, in the case where first sound is not emitted from the front speaker 290 or in the case where the frequency band corresponding to the first sound is higher than a predetermined value, the information processing device 200 can adjust the frequency band corresponding to the second sound to a frequency band outside the audible range or adjust the frequency band corresponding to the second sound to a lower value than the audible level. Here, it is to be noted that the "case where first sound is not emitted from the front speaker 290" is a concept including not only a case in which a first sound is not at all emitted from the front speaker 290 but also a case in which the first sound is very weak. Further, it is to be noted that the "frequency band corresponding to the first sound" is a frequency band in which the first sound has a sound pressure level that is so high that it has an influence on the perception of a user (sound pressure level equal to or higher than a predetermined value) and that a frequency band in which the first sound has a sound pressure level that is so low that it has no influence on the perception of a user can be excepted. Furthermore, the "predetermined value" in the "case where the frequency band corresponding to the first sound is higher than a predetermined value" assumes that it is a frequency that is at least equal to or higher than the frequency band corresponding to the second sound and for which it is difficult to take such countermeasures as to make the sound pressure level of the second sound lower than the sound pressure level of the first sound until the second sound is not perceived by a user (note that this is no restrictive).

Figure 4B:
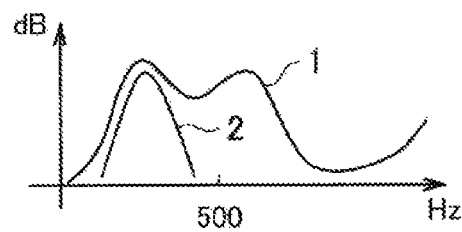
Figure 5A:
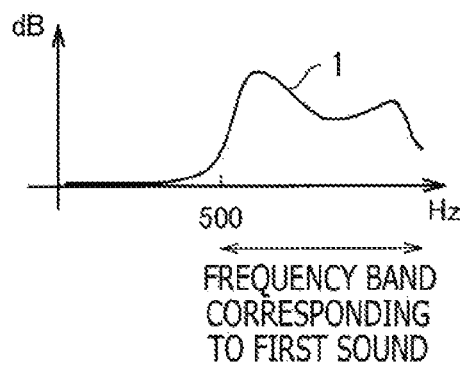
FIGS. 5A and 5B are view illustrating another method for generating tactile data such that second sound is not perceived by a user.
Figure 5B:
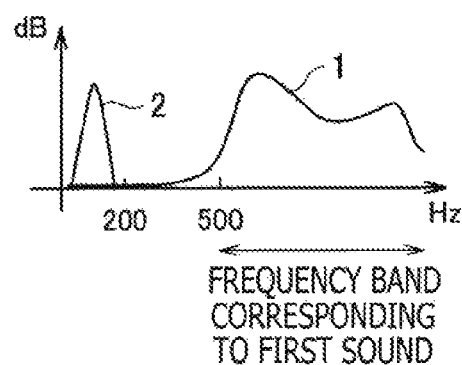

For example, a case is considered in which frequency characteristic information, included in the first perception characteristic information, of first sound when the first sound reaches an ear of a user has such a waveform 1 as depicted in FIG. 5A. In such a case, since the frequency band corresponding to the first sound is higher than a predetermined value (in FIG. 5A, 500 [Hz]), the information processing device 200 adjusts the frequency band corresponding to the second sound to the outside of the audible range (in FIG. 5A, to 200 [Hz] or less) as depicted in FIG. 5B. By this, even if it is difficult to take such countermeasures as to make the sound pressure level of the second sound lower than the sound pressure level of the first sound until the second sound is not perceived by a user as described above, the information processing device 200 can prevent the second sound from being perceived by a user. It is to be noted that, if the modes of FIG. 4B and FIG. 5B are compared with each other, then the mode of FIG. 4B is considered preferable because it can present a more various tactile stimulus to a user.

Furthermore, in the case where the frequency band corresponding to the first sound is sufficiently greater than the frequency band corresponding to the second sound, the information processing device 200 may decrease the ratio of the second sound such that the second sound is not perceived by a user (is less likely to be perceived). For example, in the case where sound in a high frequency band is emitted with a considerable sound volume from the front speaker 290, the information processing device 200 can make it possible to prevent the second sound from being perceived (to make second sound less likely to be perceived) by the user only by decreasing the ratio of the second sound. It is to be noted that the "case where the frequency band corresponding to the first sound is sufficiently greater than the frequency band corresponding to the second sound" can be rephrased as a "case in which the frequency band corresponding to the first sound is higher than a predetermined value" or as a "case in which the difference between a frequency corresponding to a sound pressure level at a peak of the first sound and a frequency corresponding to a sound pressure level at a peak of the second sound is greater than a predetermined value" (it is to be noted that the "predetermined values" are different from that described hereinabove).

2. EXAMPLE OF FUNCTIONAL CONFIGURATION OF DEVICE

The foregoing description is directed to an overview of the information processing system according to the present disclosure. Now, an example of a functional configuration of the information processing device 200 and the sensation presentation device 100 in the information processing system according to the present disclosure is described.
(2.1. Example of Functional Configuration of Information Processing Device 200

First, an example of a functional configuration of the information processing device 200 is described with reference to FIG. 6. As depicted in FIG. 6, the information processing device 200 includes a control section 210, a generation section 220, a communication section 230, a display section 240, and a storage section 250 and is connected to an external controller 260 through the communication section 230.
(Control Section 210)

The control section 210 is a functional configuration that generally controls the functional configurations of the information processing device 200. For example, the control section 210 can control starting and stopping of the functional configurations on the basis of inputting using the controller 260 and designate contents of a sensation to be presented to a user by the sensation presentation device 100 (for example, contents, timing, strength and so forth of a tactile stimulus to be presented by the tactile data presentation section 121, contents, timing, and volume of sound to be presented by the acoustic data presentation section 131, and so forth). Further, the control section 210 can control devices other than the information processing device 200 in the information processing system by generating various control signals. It is to be noted that contents of control of the control section 210 are not limited to them. For example, the control section 210 may implement processes performed generally by a computer for universal use, a PC (Personal Computer), a tablet PC, a smartphone and so forth (for example, processes of an OS (Operating System) and so forth).

(Generation Section 220)

The generation section 220 is a functional configuration for generating various data to be used by the information processing system. More particularly, the generation section 220 is a functional configuration that generates data to be used for presentation of a tactile stimulus, a sound, a light, a video, a smoke, and a wind. It is to be noted that generation of data to be used for presentation of a tactile stimulus, a sound and, a light is hereinafter described. The generation section 220 generates data to be used for presentation of a video, a smoke, and a wind at any time under the control of the control section 210 and provides the generated data to the individual devices through the network to which the projector 300, the smoke generator 330, and the wind generator 340 are connected. Further, as depicted in FIG. 6, the generation section 220 includes a tactile data generation section 221, an acoustic data generation section 222, and a lighting data generation section 223.

(Tactile Data Generation Section 221)

The tactile data generation section 221 is a functional configuration that generates tactile data to be used for presentation of a tactile stimulus by the tactile data presentation section 121 of the sensation presentation device 100. Describing more particularly, the tactile data generation section 221 acquires first perception characteristic information and second perception characteristic information regarding a content to be provided to a user. It is to be noted that the acquisition source of such information is not limited specifically. For example, the first perception characteristic information and the second perception characteristic information may be information acquired from a user who enjoyed the content in the past or may be information acquired from a user who is enjoying the content at present (information of part of the content ended by now). Further, the first perception characteristic information and the second perception characteristic information may be information acquired in regard to another content similar to the content. The first perception characteristic information and the second perception characteristic information can be acquired, for example, by a sensor mounted on an ear of each user who has enjoyed (or is currently enjoying) the content in a state in which the user sits on a seat. Further, the first perception characteristic information and the second perception characteristic information may be estimated on the basis of the position (or seat) of the user.

Then, the tactile data generation section 221 adjusts, on the basis of the first perception characteristic information and the second perception characteristic information, the ratio (SN ratio) between the first sound and the second sound that reach an ear of a user to generate tactile data. For example, as described above, the tactile data generation section 221 can generate tactile data such that the sound pressure level of the second sound is lower than the sound pressure level of the first sound in the audible range of the user.

Figure 8A:
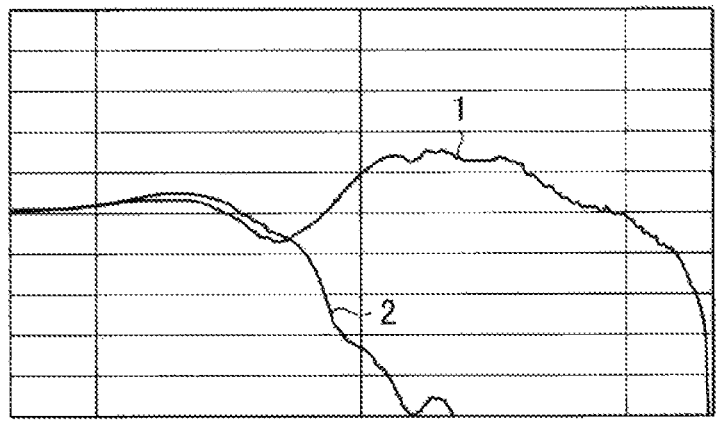
FIGS. 8A and 8B are view illustrating another method for generating tactile data such that second sound is not perceived by a user.
Figure 8B:
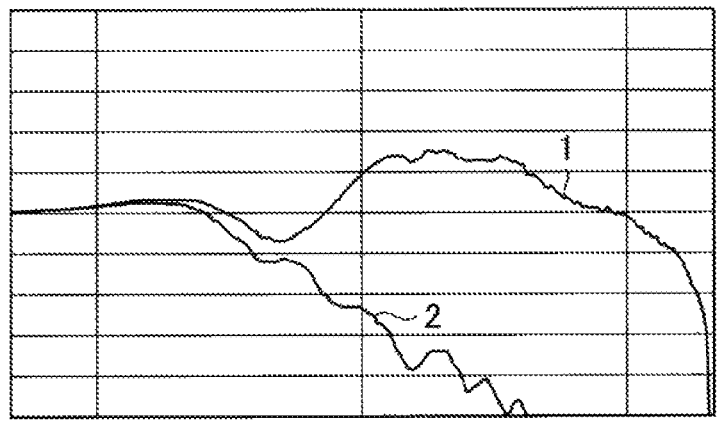

Description is given with reference to more particular examples depicted in FIGS. 7, 8A, and 8B. For example, a case is considered in which the waveform 1 of the first sound included in the first perception characteristic information changes in the order of (1) to (3) of FIG. 7 as time passes and the waveform 2 of the second sound included in the second perception characteristic information changes in the order of (4) to (6) of FIG. 7 as time passes. In such a case, in the case where the tactile data generation section 221 uses the tactile data as they are without adjusting the same upon presentation of a tactile stimulus, a waveform band in which the sound pressure level of the second sound that reaches an ear of a user is higher than the sound pressure level of the first sound sometimes appears in the audible range of the user as depicted in FIG. 8A (in FIG. 8A, a graph in the case where (3) and (6) of FIG. 7 are compared with each other is depicted). Accordingly, the user will perceive the second sound and feel uncomfortable.

Thus, the tactile data generation section 221 adjusts the waveform 2 of the second wave at timings in such a manner as depicted in (4)' to (6)' of FIG. 7. By this, in the audible range of the user, the sound pressure level of the second sound that reaches an ear of the user becomes lower than the sound pressure level of the first sound as depicted in FIG. 8B (in FIG. 8B, a graph in the case where (3)' and (6)' of FIG. 7 are compared with each other is depicted). Accordingly, the user does not feel uncomfortable because the user does not perceive the second sound any more.

Further, in the case where the first sound is not emitted from the front speaker 290, or in the case where the frequency band corresponding to the first sound is higher than the predetermined value, the tactile data generation section 221 can adjust the frequency band corresponding to the second sound to the outside of the audible range or can adjust the sound pressure level of the second sound to a value lower than the audible level.

Figure 9:
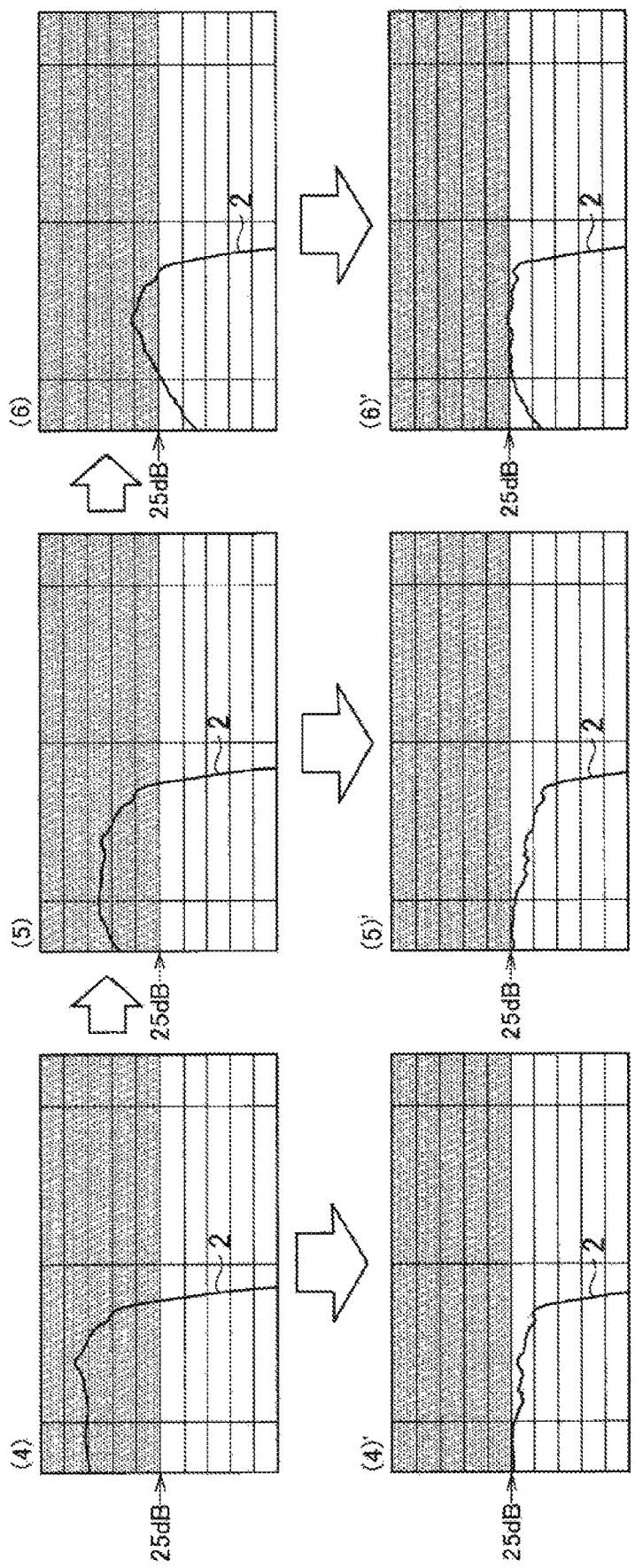
FIG. 9 is a view illustrating a further method for generating tactile data such that second sound is not perceived by a user.

Here, description is given with reference to a more detailed particular example depicted in FIG. 9. A case is considered in which the first sound is not emitted from the front speaker 290 and the waveform 2 of the second sound included in the second perception characteristic information changes in the order of (4) to (6) of FIG. 9 as time passes. In such a case, since the sound pressure level of the second sound is equal to or higher than the audible level (in the present example, 25 [dB]) in the audible range of the user, the user will perceive the second sound and feel uncomfortable.

Therefore, the tactile data generation section 221 adjusts the sound pressure level of the second sound at different timings to values lower than the audible level as depicted in (4)' to (6)' of FIG. 9. Consequently, the user does not feel uncomfortable because the user does not perceive the second sound any more.

Further, in the case where the frequency band corresponding to the first sound is sufficiently greater than the frequency band corresponding to the second sound, the tactile data generation section 221 may decrease the ratio of the second sound such that the second sound is not perceived (is less likely to be perceived) by the user as described hereinabove.

It is to be noted that the tactile data generation section 221 can perform the adjustment described above using an arbitrary waveform adjustment technology or sound pressure adjustment technology (software for exclusive use or the like). It is to be noted that the type of the waveform adjustment technology or the sound pressure adjustment technology to be used is not restricted specifically.

(Acoustic Data Generation Section 222)

The acoustic data generation section 222 is a functional configuration for generating acoustic data to be used for presentation of a first sound by the front speaker 290 and the acoustic data presentation section 131 of the sensation presentation device 100 under the control of the control section 210. The acoustic data generation section 222 provides the acoustic data to the front speaker 290 and the sensation presentation device 100 through a predetermined network.

(Lighting Data Generation Section 223)

The lighting data generation section 223 is a functional configuration for generating lighting data to be used for presentation of light (lighting) by the light 320 under the control of the control section 210. The lighting data generation section 223 provides the lighting data to the light 320 through a predetermined network.

(Communication Section 230)

The communication section 230 is a functional configuration for performing communication with an external apparatus. For example, in the case where an operator of the information processing device 200 performs inputting using the controller 260, the communication section 230 receives the input data from the controller 260 and provides the input data to the control section 210 to implement reflection of the input by the operator. Further, the communication section 230 transmits data generated by the generation section 220 (including, for example, tactile data, acoustic data and so forth) to a predetermined external apparatus to implement presentation of a tactile stimulus, a sound, a video, a lighting, a smoke, a wind and so forth. It is to be noted that the data communicated by the communication section 230 are not limited to them. For example, the communication section 230 may receive the first perception characteristic information and the second perception characteristic information from the sensation presentation device 100 or the like. Further, the types of the communication method and the communication line to be used for communication between the communication section 230 and respective external apparatuses are not restricted specifically. For example, the communication section 230 may perform communication by wired communication or by wireless communication with the respective external apparatuses.

(Display Section 240)

The display section 240 is a functional configuration for displaying a setting screen image to be used for inputting by an operator and so forth. The display section 240 may be a display device such as, for example, a liquid crystal display (LCD: Liquid Crystal Display) or an organic EL (Electro Luminescence) display. It is to be noted that the type and display contents of the display section 240 are not limited to them.

(Storage Section 250)

The storage section 250 is a functional configuration for storing various data. For example, the storage section 250 stores programs and parameters to be used by the functional configurations of the information processing device 200, data generated by the functional configurations (for example, tactile data, acoustic data, lighting data and so forth) and so forth. It is to be noted that contents of the data to be stored into the storage section 250 are not limited to them.

(Controller 260)

The controller 260 is a device for receiving an input by an operator and providing input data to the information processing device 200. The controller 260 includes various inputting mechanisms such as a keyboard, a mouse, buttons, switches, levers, touch sensors, pressure sensors, or proximity sensors. It is to be noted that the types of inputting mechanisms provided in the controller 260 are not limited to them. Further, the controller 260 may not be provided as an external apparatus of the information processing device 200 but may be provided in the information processing device 200.

The example of a functional configuration of the information processing device 200 and the controller 260 have been described. It is to be noted that the functional configuration described above with reference to FIG. 6 is an example to the last, and the functional configuration of the information processing device 200 is not limited to such example. For example, the information processing device 200 may not necessarily include all of the functional configurations depicted in FIG. 6. All or part of the functional configurations of the information processing device 200 may be provided in an external apparatus such as the sensation presentation device 100. Further, the functional configuration of the information processing device 200 can be modified flexibly in accordance with the specification or practical use.

(2.2. Example of Functional Configuration of Sensation Presentation Device 100)

Figure 10:
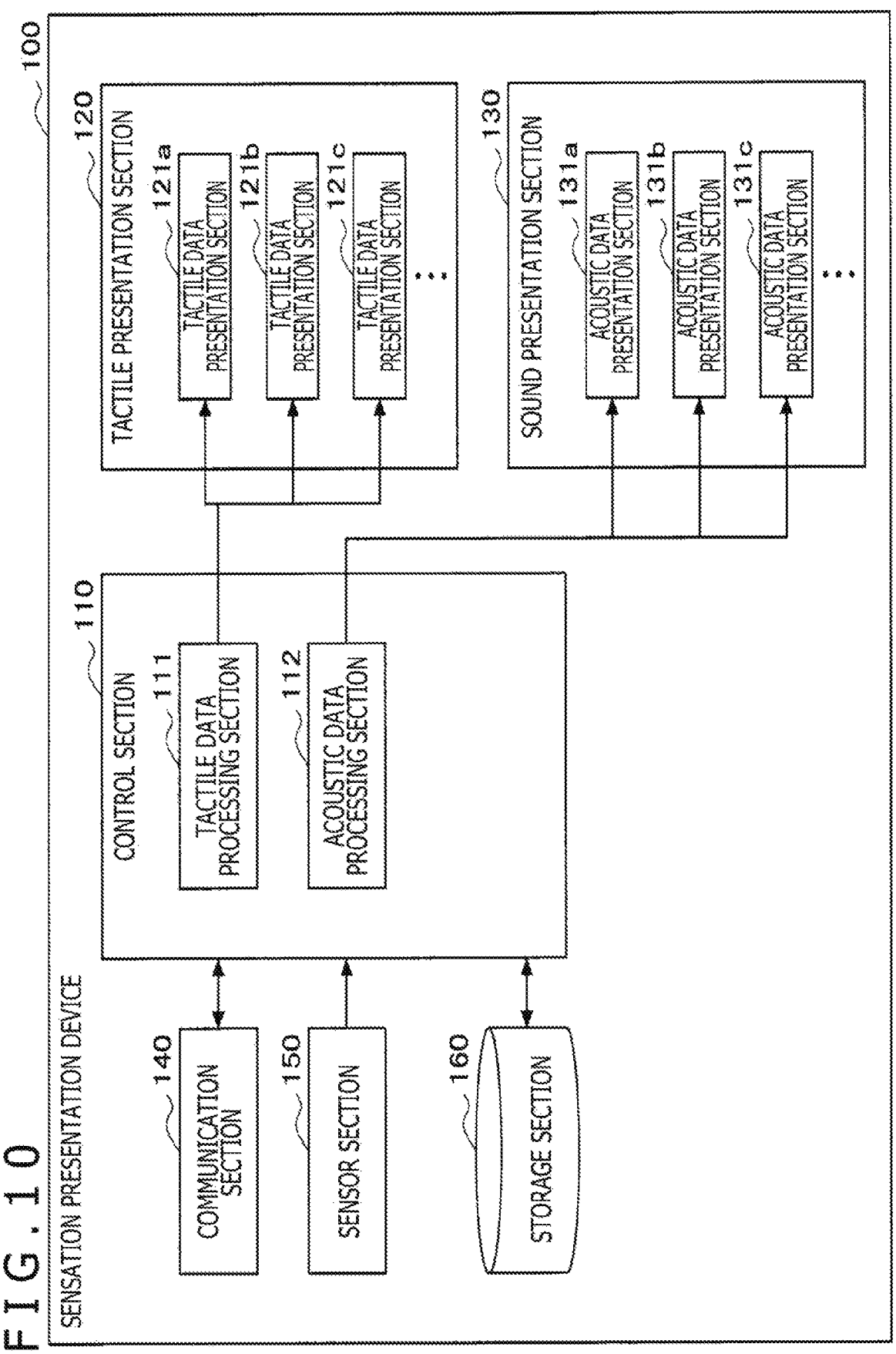
FIG. 10 is a block diagram depicting an example of a functional configuration of the sensation presentation device 100.

The foregoing description is directed to an example of a functional configuration of the information processing device 200. Now, an example of a functional configuration of the sensation presentation device 100 is described with reference to FIG. 10. As depicted in FIG. 10, the sensation presentation device 100 includes a control section 110, a tactile presentation section 120, a sound presentation section 130, a communication section 140, a sensor section 150, and a storage section 160.

(Control Section 110)

The control section 110 is a functional configuration that generally controls the functional configurations of the sensation presentation device 100. For example, the control section 110 controls starting and stopping of the functional configurations on the basis of various data (including, for example, tactile data, acoustic data, other control signals and so forth) provided from the information processing device 200. It is to be noted that contents of control of the control section 110 are not limited to them. For example, the control section 110 may implement processes that are generally performed in a computer for universal use, a PC, a tablet PC, a smartphone and so forth (for example, processes of an OS or the like). Further, as depicted in FIG. 10, the control section 110 includes a tactile data processing section 111 and an acoustic data processing section 112.

(Tactile Data Processing Section 111)

The tactile data processing section 111 performs a process relating to presentation of a tactile stimulus by the tactile data presentation section 121 using tactile data provided from the information processing device 200. For example, the tactile data processing section 111 may implement presentation of a tactile stimulus by editing, on the basis of settings of the individual sensation presentation device 100 (for example, settings of the sensation presentation device 100 performed uniquely by a user (for example, setting of a volume, setting of ON/OFF of the function and so forth)), tactile data provided from and information processing device 200 and providing the tactile data after the editing to the tactile data presentation section 121.

(Acoustic Data Processing Section 112)

The acoustic data processing section 112 performs processes relating to presentation of a first sound by the acoustic data presentation section 131 using acoustic data supplied from the information processing device 200. For example, the acoustic data processing section 112 may implement presentation of the first sound by editing, on the basis of settings of the individual sensation presentation device 100 (for example, settings of the sensation presentation device 100 performed uniquely by a user (for example, setting of a volume, setting of ON/OFF of the function and so forth)), acoustic data provided from the information processing device 200 and providing the first sound after the editing to the acoustic data presentation section 131.

(Tactile Presentation Section 120)

The tactile presentation section 120 is a functional configuration that includes one or more tactile data presentation sections 121 and presents a tactile stimulus to the user using the tactile data presentation section 121.

(Tactile Data Presentation Section 121)

The tactile data presentation section 121 is a functional configuration for presenting a tactile stimulus to a user using tactile data provided from the tactile data processing section 111. For example, the tactile data presentation section 121 may be an actuator that presents vibration (for example, an ERM (eccentric motor), an LRA (linear resonance actuator), a VCM (voice coil motor) or the like), or may be an electric element that presents a sensation of force or else may be a temperature change element that presents a temperature sensation (for example, a Peltier element or the like). In other words, the "tactile stimulus" can include a vibration, a sensation of force, a temperature sensation and so forth. It is to be noted that the tactile stimulus to be presented by the tactile data presentation section 121 is not limited to them. Further, a channel may be allocated to each of the tactile data presentation sections 121 (in FIG. 10, at least the tactile data presentation section 121a to the tactile data presentation section 121c) such that presentation of a tactile stimulus that is different for each channel is performed.

(Sound Presentation Section 130)

The sound presentation section 130 includes one or more acoustic data presentation sections 131 and has a functional configuration that it presents a first sound to the user using the acoustic data presentation sections 131.

(Acoustic Data Presentation Section 131)

The acoustic data presentation section 131 is a functional configuration that presents a first sound to the user using acoustic data provided from the acoustic data processing section 112. For example, the acoustic data presentation section 131 can include a speaker for reproducing acoustic data, an amplification circuit for the speaker and so forth. Further, a plurality of acoustic data presentation sections 131 (in FIG. 10, at least the acoustic data presentation section 131a to the acoustic data presentation section 131c) may be provided such that localization of a sound image may be implemented by adjusting outputs of the acoustic data presentation sections 131. At this time, the sound image may be localized by cooperation of the acoustic data presentation sections 131 and speakers provided around them (for example, speakers at the seats). It is to be noted that different channels may be allocated to the individual acoustic data presentation sections 131 such that presentation of sound that is different among the different channels is performed.

(Communication Section 140)

The communication section 140 is a functional configuration that performs communication with an external apparatus. For example, the communication section 140 receives various data generated by the information processing device 200 (including, for example, tactile data, acoustic data, other control signals and so forth). It is to be noted that the data communicated by the communication section 140 are not limited to them. Further, the types of the communication method and the communication lines to be used for communication between the communication section 140 and the external apparatus are not restricted specifically. For example, the communication section 140 may perform wired communication with an external apparatus or may perform wireless communication.

(Sensor Section 150)

The sensor section 150 includes various sensors and has a functional configuration for acquiring sensor data generated by the sensors. For example, the sensor section 150 may include a position sensor (a sensor that can be used for specification of the position of a user including, for example, a GNSS (Global Navigation Satellite System) receiver, a proximity sensor and so forth) such that it acquires sensor data to be used for specification of the position of the user. Where the position of the user is specified by analysis using the sensor data, the first perception characteristic information and the second perception characteristic information can be estimated on the basis of the position of the user described above. It is to be noted that the type of the sensor provided in the sensor section 150 is not restricted specifically. For example, the sensor section 150 may include various sensors such as a posture sensor (a gyro sensor, an acceleration sensor or the like), a temperature sensor, or a pressure sensor.

(Storage Section 160)

The storage section 160 has a functional configuration for storing various data. For example, the storage section 160 stores programs and parameters to be used by the functional configurations of the sensation presentation device 100, or various data provided from the information processing device 200 (including, for example, tactile data, acoustic data, other control signals and so forth) and so forth. It is to be noted that contents of the data stored in the storage section 160 are not limited to them.

An example of the functional configuration of the sensation presentation device 100 has been described above. It is to be noted that the functional configuration described hereinabove with reference to FIG. 10 is an example to the last, and the functional configuration of the sensation presentation device 100 is not limited to such an example as described above. For example, the sensation presentation device 100 may not necessarily include all of the functional configurations depicted in FIG. 10. Further, the functional configuration of the sensation presentation device 100 can be modified flexibly in accordance with specifications or a practical use.

3. EXAMPLE OF PROCESSING FLOW OF DEVICE

Figure 11:
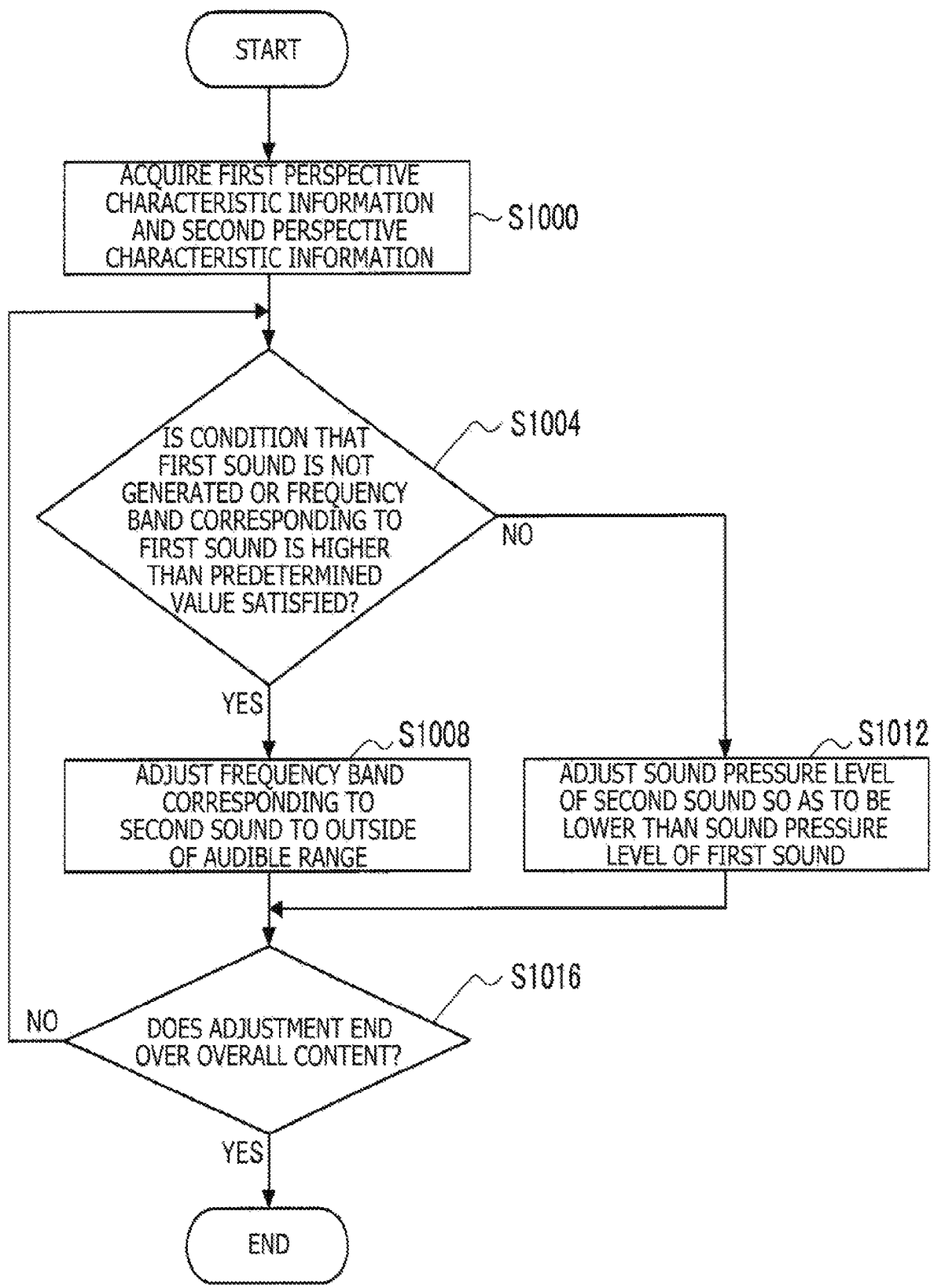
FIG. 11 is a flow chart illustrating an example of a flow of a generation process of tactile data.

The foregoing description is directed to an example of a functional configuration of the information processing device 200 and the sensation presentation device 100 in the information processing system according to the present disclosure. Subsequently, an example of a flow of a generation process of tactile data to be used for presentation of a tactile stimulus is described with reference to FIG. 11. FIG. 11 depicts a flow of processing in the case where tactile data to be used for presentation of a tactile stimulus of emitting a second sound that is not perceived by a user is generated (programmed) in advance on the basis of first perception characteristic information and second perception characteristic information before starting of a content.

First, at step S1000, the tactile data generation section 221 of the information processing device 200 acquires first perception characteristic information and second perception characteristic information regarding a content to be presented to a user. As described hereinabove, the acquisition sources of such information are not restricted specifically. At step S1004, the tactile data generation section 221 confirms, for each timing of the content (for example, for each segment), whether or not first sound is emitted or whether or not a frequency band corresponding to the first sound is higher than a predetermined value (for example, 500 [HZ]).

In the case where the first sound is not emitted or the frequency band corresponding to the first sound is higher than the predetermined value (step S1004/Yes), the tactile data generation section 221 adjusts the frequency band corresponding to the second sound to the outside of the audible range (for example, 200 [Hz] or less) at step S1008 (it is to be noted that the tactile data generation section 221 may adjust the sound pressure level of the second sound to a value lower than the audible level). In the case where the first sound is emitted and besides the frequency band corresponding to the first sound is equal to or lower than the predetermined value (step S1004/No), the tactile data generation section 221 generates tactile data at step S1012 such that the sound pressure level of the second sound is lower than the sound pressure level of the first sound in the audible range of the user. The processes at step S1004 to step S1012 are repeated until the adjustment described above ends over the overall content (step S1016/No).

It is to be noted that the steps in the flow chart of FIG. 11 need not necessarily be processed in a time series in accordance with the order described. In particular, the steps in the flow chart may be processed in an order different from the described order or may be processed in parallel. Further, though not depicted in the flow chart of FIG. 11, the tactile data generation section 221 may perform decision of whether or not the frequency band corresponding to the first sound is sufficiently greater than the frequency band corresponding to the second sound and generate tactile data such that, in the case where the frequency band corresponding to the first sound is sufficiently greater than the frequency band corresponding to the second sound, the ratio of the second sound is decreased as described hereinabove. Further, the tactile data generation section 221 may not generate (program) tactile data in advance before starting of a content but generate tactile data on the real time basis when a content is provided.

4. EXAMPLE OF HARDWARE CONFIGURATION

The foregoing description is directed to a flow of a generation process of tactile data. Now, an example of a hardware configuration of the information processing system according to the present disclosure is described.

(4.1. Sensation Presentation Device 100)

First, a hardware configuration of the sensation presentation device 100 is described. The sensation presentation device 100 has a structure that two vests including an outer vest having no size adjustment function and an inner vest having a size adjustment function are placed one on the other (structure that the outer vest covers the inner vest from above). Further, taking easiness to put on and take off by a user into consideration, the outer vest and the inner vest may be partially physically connected to each other, for example, at the opposite shoulder portions. Here, an example of the outer vest is depicted in FIG. 12 and an example of the inner vest is depicted in FIGS. 13A and 13B.

FIG. 12 depicts an example of the outer vest of the sensation presentation device 100 (that is depicted in FIG. 2) in which the acoustic data presentation sections 131 are disposed at the opposite shoulder regions. Further, the outer vest (and the inner vest depicted in FIG. 13A) includes an opening and closing mechanism 10 (for example, a fastener, a hook-and-loop fastener, a button or the like. It is to be noted that the opening and closing mechanism 10 is not limited to them) in the middle of the front body thereof. Consequently, the user can put on and take off the sensation presentation device 100 of the two-layer structure easily and efficiently without performing a movement of a high load such as to pass the head through the sensation presentation device 100. Further, in the case where the user feels uncomfortable or in a like case, the user can take off the sensation presentation device 100 easily and rapidly. Further, the outer vest includes a predetermined number of pockets 11 (in the example of FIG. 12, the pocket 11a to the pocket 11d) at the front body thereof. Consequently, since the outer vest can accommodate parts to be worn on a wrist or a foot hereinafter described, in the case where such parts are not used, management of the parts is facilitated. It is to be noted that, although mainly a case in which the sensation presentation device 100 of the vest type is adopted because that the user can move the arms easily, that the sensation presentation device 100 is superior in breathability and so forth are taken into consideration, the shape of the sensation presentation device 100 (especially, the shape of the outer vest) can be changed to various designs in accordance with an application of the same (contents of the content).

FIG. 13A depicts an example of the front body of the inner vest and FIG. 13B depicts an example of the back body of the inner vest. As depicted in FIGS. 13A and 13B, an adjustment mechanism 12 (in the example of FIGS. 13A and 13B, a hook-and-loop fastener) that can steplessly adjust the size of the inner vest is provided on side face portions of the inner vest. In order for the sensation presentation device 100 to transmit a tactile stimulus to the body of the user, it is desirable that the sensation presentation device 100 and the tactile data presentation section 121 are pressed against the body by appropriate pressure. However, the body of the user has a significant individual difference depending upon the age, sex and so forth. Therefore, the inner vest includes the adjustment mechanism 12 such that the contact pressure between the tactile data presentation section 121 and the body can be adjusted and an optimum tactile stimulus can be presented for each user. Further, since the inner vest is covered with the outer vest when it is used, the adjustment mechanism 12 is not exposed to the surface. Consequently, the designability of the wear is improved, and it can be prevented that large sound is generated to discomfort the audience around the user by operating the hook-and-loop fastener for attachment and removal in order for the user itself to perform size adjustment of the inner vest using the hook-and-loop fastener. Note that it is assumed that wearing of the sensation presentation device 100 by the user is completed before the content is started and size adjustment or putting on and taking off is not performed except during break time or the like. More particularly, it is assumed that a space for wearing (putting on and taking off) of the sensation presentation device 100 is provided at a position different from a seat on which the user is to be seated and a clerk in charge assists putting on or taking off of the sensation presentation device 100 by the user (naturally, this is not restrictive).

Further, the inner vest includes a fixation mechanism 13 that can fix the tactile data presentation section 121 (in the example of FIGS. 13A and 13B, a hook-and-loop fastener). When the sensation presentation device 100 presents a tactile stimulus to a user, desirably the tactile stimulus is presented to a similar position without being influenced by the individual difference (size of the body or the like) for each user. In particular, it is desirable that the arrangement of the tactile data presentation section 121 is adjusted in response to an individual difference for each user. Further, the position (region) at which a tactile stimulus is to be presented changes in response to contents or staging of a content such as a drama or a movie. For example, the positions at which a tactile stimulus is to be presented change depending upon the content such that, in the case of a drama A, they are four places of the front of the body; in the case of another dram B, they are six places of the front of the body; and in the case of a movie A, they are two places of the front in addition to the six places of the front of the body. Therefore, the inner vest has the fixation mechanisms 13 provided over a substantially overall face thereof to allow the tactile data presentation section 121 to be fixed at a desired position.

Here, a particular example of the fixation mode of the tactile data presentation section 121 is described with reference to FIGS. 14A and 14B. It is not assumed basically that, upon wearing by the user before a content is started, the fixation position of the tactile data presentation sections 121 is changed by the user itself (this is not restrictive). Therefore, as depicted in FIG. 14A, the inner vest has a two-sheet structure, and the fixation mechanism 13 is provided on the inner side of the two-sheet structure such that it cannot be touched by the user. The tactile data presentation section 121 can be fixed to the inner vest by being sandwiched by the fixation mechanism 13 (hook-and-loop fastener female or the like) and another fixation mechanism 14 (hook-and-loop fastener male or the like) which is a separate part. It is assumed that, as depicted in FIG. 14A, the fixation mechanism 13 is provided on an inner side face of an "outer side 15 of the inner vest" (outer vest side) in the two-sheet structure. In other words, it is assumed that the fixation mechanism 13 is not provided on an "inner side 16 of the inner vest" (user body side) in the two-sheet structure. Consequently, the tactile data presentation section 121 is pressed against the body of the user precisely by tensile force of the "outer side 15 of the inner vest" generated by fastening pressure of the adjustment mechanism 12 upon size adjustment.

Further, since the "inner side 16 of the inner vest" exists as a face, when the user puts on or takes off the sensation presentation device 100, the projecting tactile data presentation sections 121 are prevented from disturbing such putting on or taking off. Although the sensation presentation device 100 desirably has a two-layer structure of the inner vest and the outer vest as described hereinabove, only the inner vest may be used by itself taking easiness of putting on and taking off into consideration. Also in this case, since the inner vest has such a structure as described above, the tactile data presentation sections 121 can be prevented from being exposed to the surface, the designability is assured.

Further, as described hereinabove, the body of the user has an individual difference that is great depending upon the age or the sex. Therefore, such operation is conceivable that, for example, two kinds of wears including a wear for men (outer vest and inner vest) and a wear for women (outer vest and inner vest) are prepared before provision of a content and, in regard to the inner vest for women, presupposing that the adjustment mechanism 12 is rather narrowed down in accordance with the body, the fixation position of the tactile data presentation sections 121 is set to the relatively inner side in comparison with that for men. Similarly, also such operation is conceivable that, taking a height difference between men and women, the relative distance in the upward and downward direction between the tactile data presentation sections 121 is made comparatively short in comparison with that for men. Further, in regard to the wear for women, also such operation is conceivable that the tactile data presentation section 121 is arranged away from the chest. Also such operation is conceivable that three sizes of S/M/L (by a same wear) are prepared in response to the size of the body independently of the difference between men and women and fixation positions of the tactile data presentation sections 121 are made different among them as described hereinabove. Alternatively, also such operation is conceivable that the position and the number of tactile data presentation sections 121 are changed in response to contents of a content before starting of the content and design and generation of tactile data to be inputted to the tactile data presentation sections 121 are performed on the basis of the setting of the position and the number of the tactile data presentation sections 121.

Furthermore, the sensation presentation device 100 may be able to present, at a location to which a tactile stimulus is not presented depending upon a vest portion, a tactile stimulus by using some other part. For example, as depicted in FIG. 15A, the sensation presentation device 100 includes connectors such that it can be electrically connected to additional tactile data presentation sections 121 (in FIG. 15A, a tactile data presentation section 121k to a tactile data presentation section 121p) by wirings 190 (in FIG. 15A, a wiring 190a to a wiring 190f) connected to the connectors. It is to be noted that, like the tactile data presentation section 121l and the tactile data presentation section 121m in FIG. 15A, each of the added tactile data presentation sections 121 includes a connector such that it can be electrically connected to further added tactile data presentation sections 121 by wirings 190 connected to the connectors. It is to be noted that, where a cable whose length can be adjusted (for example, a curled cable or a take-up type cable) is used as for the wirings 190, movement of the user can be prevented from being disturbed by the unnecessarily long wirings 190. Further, in the case where a tactile data presentation section 121 is not added by a wiring 190, a channel that can be used for an added tactile data presentation section 121 may be used for presentation of a tactile stimulus to another portion (for example, a vest portion). This makes it possible to present a variety of tactile stimuli to the portion. It is to be noted that the additional tactile data presentation sections 121 may be connected by wireless connection.

Further, the additional tactile data presentation sections 121 are fixed by a constant pressure to the portions of the body by a predetermined fixation mechanism (for example, a hook-and-loop fastener or the like). By this structure, for example, as depicted in FIG. 15A, the sensation presentation device 100 can present a tactile stimulus to the wrists, knees, and insteps other than the vest portions. It is to be noted that the position at which an additional tactile data presentation section 121 is to be fixed is not restricted specifically and can be changed flexibly in response to contents of a content.

Figure 15B:
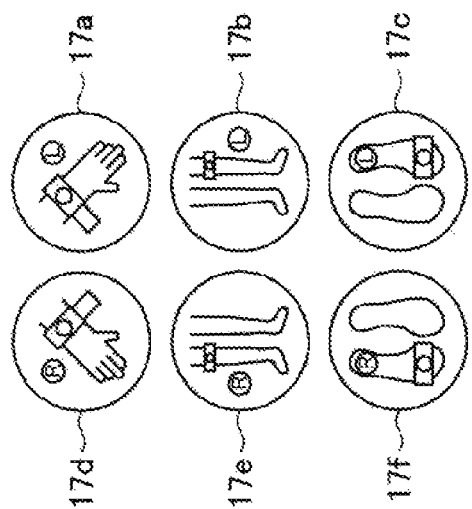
FIGS. 15A and 15B are view illustrating a wearing mode of additional tactile data presentation sections 121.
Figure 15A:
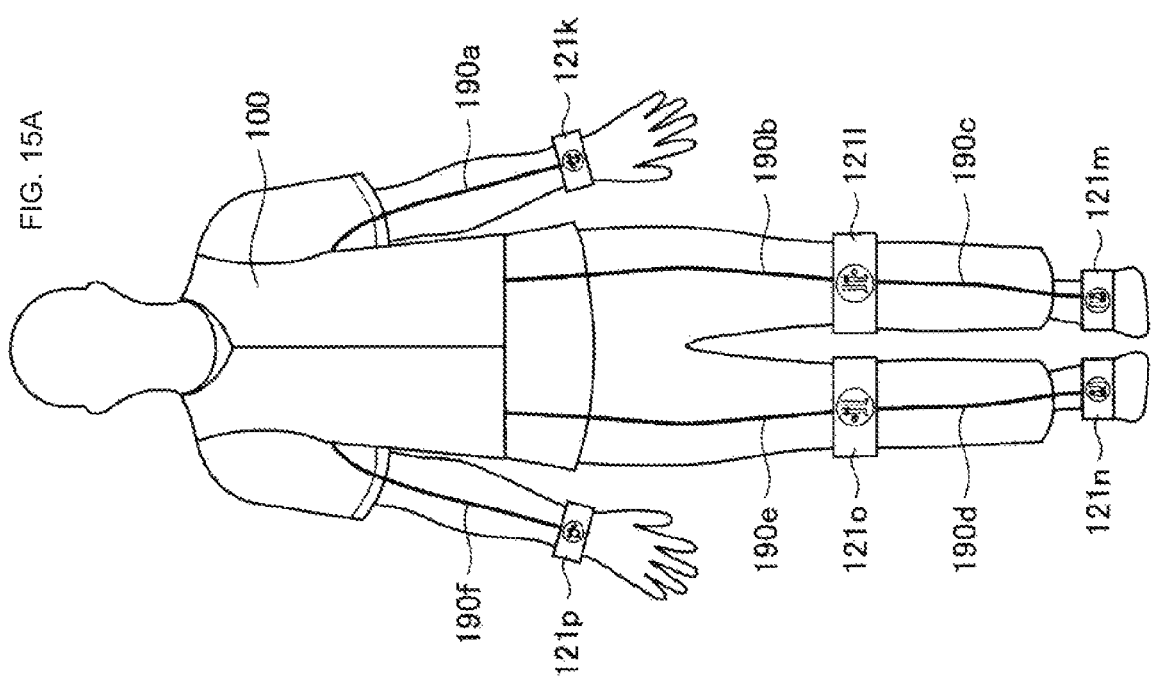

Here, as depicted in FIG. 15B, it is assumed that, to each of the additional tactile data presentation sections 121, a label 17 indicative of a fixation position (in FIG. 15B, a label 17a to a label 17f: an illustration, a character or the like representative of a fixation position is indicated) is affixed. This can prevent the user from fixing each additional tactile data presentation section 121 to a wrong position.

Figure 16:
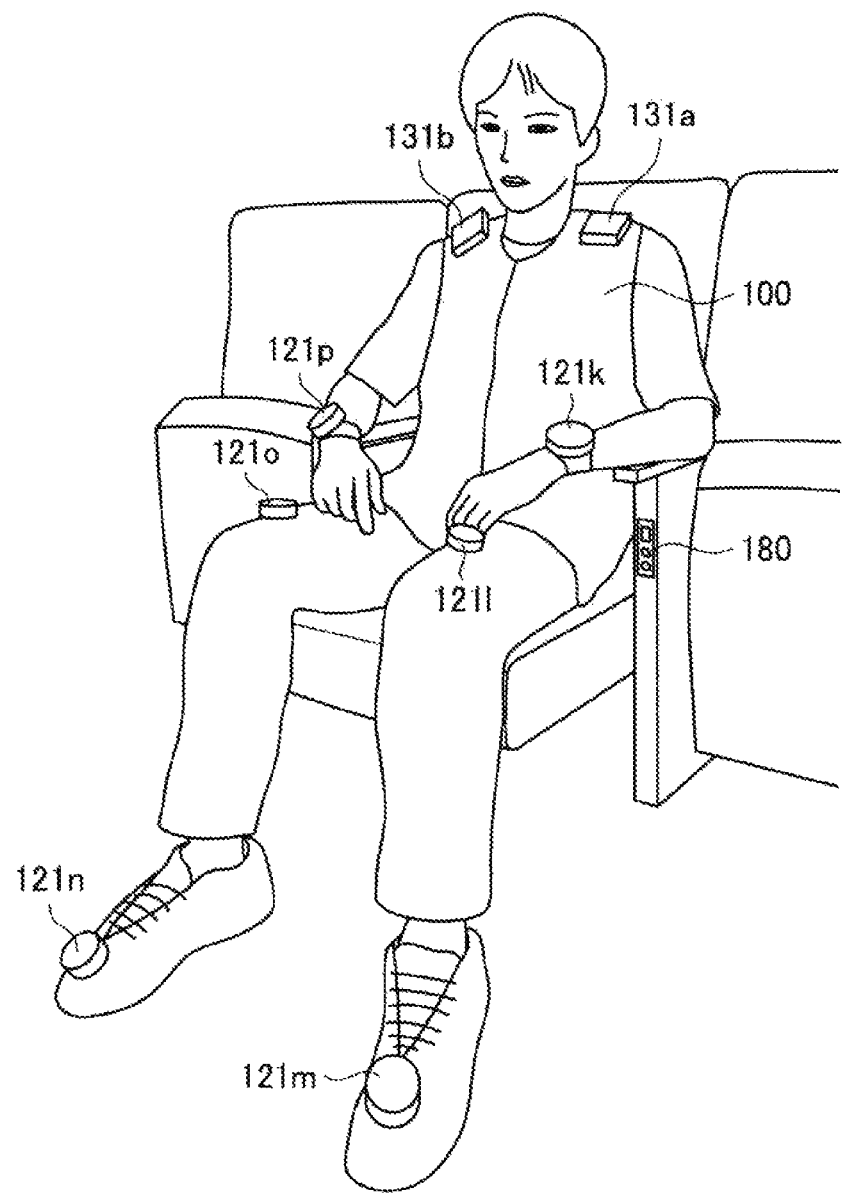
FIG. 16 is a view depicting a manner in which a user sits on a seat in a state in which it wears the sensation presentation device 100.

Now, devices that are used together with the sensation presentation device 100 are described. First, peripheral devices for a seat used in the case where a user is seated and receives provision of a content are described with reference to FIG. 16. FIG. 16 depicts a manner in which a user sits on the seat in a state in which it wears a sensation presentation device 100 (and the additional tactile data presentation section 121k to tactile data presentation section 121p). Thus, it is assumed that, for each seat, an operation panel 180 that is used for a predetermined operation by a user is installed.

Figure 17B:
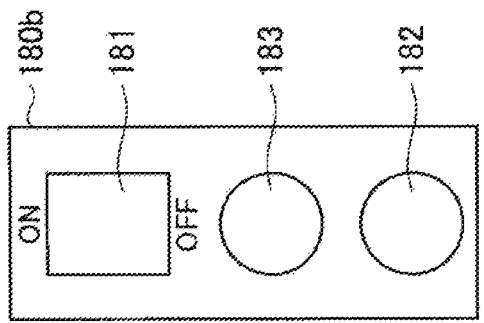
FIGS. 17A and 17B are view illustrating an operation panel 180.
Figure 17A:
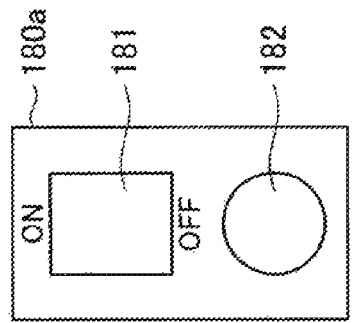

Here, particular examples of the operation panel 180 are described with reference to FIGS. 17A and 17B. The operation panel 180a depicted in FIG. 17A includes a switch 181, and the user can operate the switch 181 to switch presentation of various sensations including a tactile stimulus ON/OFF. Further, a connector 182 (female) is provided for the operation panel 180a, and the user can place the sensation presentation device 100 into an operable state by inserting a connector (male) provided for the sensation presentation device 100 into the connector 182. Meanwhile, the operation panel 180b depicted in FIG. 17B further includes a volume adjustment mechanism 183, and the user can adjust a tactile stimulus or the volume of sound to be presented by the sensation presentation device 100 to a desired magnitude.

It is to be noted that, for the sensation presentation device 100, a plurality of types (size of S/M/L, for adult/child, for male/female, color, notation number) is provided, and by connecting a sensation presentation device 100 to the connector 182, the type of the sensation presentation device 100 can be identified by the information processing system (especially by the information processing device 200) depending upon the resistance value for type detection incorporated in the sensation presentation device 100 or a contrivance for ON/OFF detection such as a DIP switch. The information processing system (especially the information processing device 200) may change a signal (volume or the like) to be supplied to the wear in response to the identified type.

(4.2. Information Processing Device 200)

Subsequently, a hardware configuration of the information processing device 200 is described with reference to FIG. 18.

Figure 18:
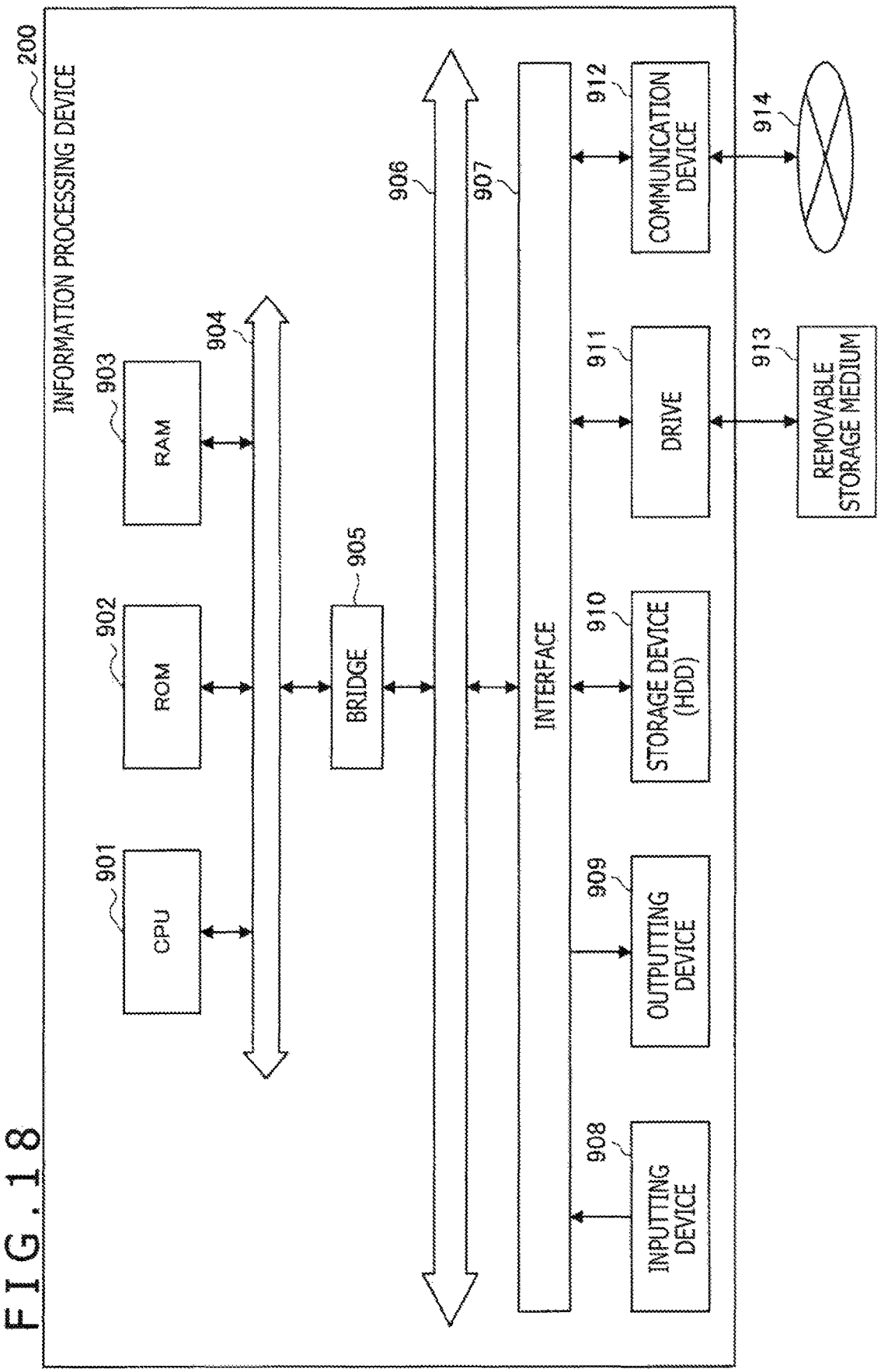
FIG. 18 is a block diagram depicting an example of a hardware configuration of the information processing device 200.

As depicted in FIG. 18, the information processing device 200 includes a CPU (Central Processing Unit) 901, a ROM (Read Only Memory) 902, a RAM (Random Access Memory) 903, a host bus 904, a bridge 905, an external bus 906, an interface 907, an inputting device 908, an outputting device 909, a storage device (HDD) 910, a drive 911, and a communication device 912.

The CPU 901 functions as an arithmetic operation processing device and a control device and controls general operation in the information processing device 200 in accordance with various programs. Further, the CPU 901 may be a microprocessor. The ROM 902 stores programs, arithmetic operation parameters and so forth to be used by the CPU 901. The RAM 903 temporarily stores a program to be used in execution of the CPU 901, parameters that change suitably in such execution and so forth. They are connected to each other by the host bus 904 configured from a CPU bus or the like. By cooperation of the CPU 901, the ROM 902, and the RAM 903, functions of the control section 210 and the generation section 220 are implemented.

The host bus 904 is connected to the external bus 906 such as a PCI (Peripheral Component Interconnect/Interface) bus through the bridge 905. It is to be noted that the host bus 904, the bridge 905, and the external bus 906 need not necessarily be configured separately from each other and the functions of them may be incorporated in one bus.

The inputting device 908 is configured from inputting means for allowing a user to input information such as a mouse, a keyboard, a touch panel, buttons, a microphone, switches, and levers, and an input controlling circuit that generates an input signal on the basis of an input by a user and outputs the input signal to the CPU 901. The user who uses the information processing device 200 can input various data and instruct a processing operation to various devices by operating the inputting device 908. The functions of the controller 260 are implemented by the inputting device 908.

The outputting device 909 includes display devices such as, for example, a CRT (Cathode Ray Tube) display device, a liquid crystal display (LCD) device, an OLED (Organic Light Emitting Diode) device, and lamps. The functions of the display section 240 are implemented by the outputting device 909.

The storage device 910 is a device for data storage. The storage device 910 may include a storage medium, a recording device for recording data into the storage medium, a reading out device for reading out data from the storage medium, a deletion device for deleting data recorded in the storage medium and so forth. The storage device 910 is configured, for example, from an HDD (Hard Disk Drive). The storage device 910 drives the hard disk to store programs to be executed by the CPU 901 and various data. The functions of the storage section 250 are implemented by the storage device 910.

The drive 911 is a reader/writer for a storage medium and is built in or externally attached to the information processing device 200. The drive 911 reads out information recorded on a removable storage medium 913 such as a magnetic disk, an optical disk, a magneto-optical disk, or a semiconductor memory loaded therein and outputs the information to the RAM 903. Further, also it is possible for the drive 911 to write information into the removable storage medium 913.

The communication device 912 is a communication interface configured from a communication device for connecting, for example, to a communication network 914 and so forth. The functions of the communication section 230 are implemented by the communication device 912.

5. REMARKS

The foregoing description is directed to an example of a hardware configuration in the information processing system according to the present disclosure. Now, as remarks, operational aspects in the information processing system according to the present disclosure are described.

(5.1. Confirmation of Operation of Sensation Presentation Device 100)

In the case where the information processing system according to the present disclosure is used, before starting of a content, an operation confirmation work can be performed in a state in which the sensation presentation device 100 is connected to the connector 182 of the operation panel 180.

In the operation confirmation work, as a first step, for the object of confirmation of a conduction state and so forth, audible sound is sequentially generated from the tactile data presentation sections 121 (actuators) of the sensation presentation device 100 such that a confirmer performs operation confirmation with its ears. At this time, the audible sound may be changed for each tactile data presentation section 121 (for example, identification information such as "1," "2," "3" and so forth is allocated to the individual tactile data generation section 221 of each sensation presentation device 100 such that the respective identification information is outputted as audible sound to the tactile data presentation sections 121). As a second step, for the object of confirmation of a failure state of the tactile data presentation sections 121, simple waveforms of low audibility such as a Sin wave of 100 [Hz] are sequentially inputted to the tactile data presentation sections 121. For example, in the case where some abnormal sound is heard by the confirmer at the second step, it is estimated that the tactile data presentation section 121 suffers from damage or the like.

The works at the first step and the second step are performed by rendering the sensation presentation devices 100 operative one by one such that sounds emitted from the sensation presentation device 100 may not mix with each other. For example, the confirmer successively performs the works at the first step and the second step while operating the switch 181 of the operation panel 180 to sequentially switching the sensation presentation devices 100 ON/OFF.

It is to be noted that generation of audible sound from the sensation presentation devices 100 or the like may be performed while being displaced little by little for each sensation presentation device 100 such that the confirmer can perform the operation confirmation work without moving from a seat to another seat. Further, such dealing is conceivable that identification information such as "1," "2," or "3" is allocated to each sensation presentation device 100 while such identification information as "1," "2," or "3" is allocated to each tactile data generation section 221 of each sensation presentation device 100 and a combination of identification information of a sensation presentation device 100 and a tactile data presentation section 121 like "1-1," "1-2," or "1-3" is outputted to the tactile data presentation section 121 as audible sound. This makes it possible for the confirmer to perform the operation confirmation work without moving from a position at which the operator can hear the audible sound emitted from all sensation presentation devices 100. Further, the hearing work of the audible sound may be performed by a device for exclusive use. Further, an acceleration sensor may be provided in each tactile data presentation section 121 such that operation confirmation is performed by analysis or the like of acceleration data when each tactile data presentation section 121 vibrates.

(5.2. Dealing of Operator)

An operator who operates the controller 260 described above would be positioned in a control booth behind (or in the middle of) the auditorium such that the operator can overlook the stage and the auditorium, and would operate interfaces provided on the controller 260 such as a touch panel and physical switches in accordance with a timing of movement of a performer on the stage in response to a progress determined in advance.

By a predetermined operation performed for the controller 260, devices relating to state effects such as acoustics, lighting, videos, or tactile stimuli can be collectively controlled on the real time basis. For example, the operator can collectively control the strength of the stage effects outputted from the devices relating to the stage effects such as acoustics, lighting, videos, or tactile stimuli on the real time basis by an operation of a slide bar provided on the controller 260. For example, if the operator lowers the slide bar, then the sound volume decreases and the strength of tactile stimuli presented by the tactile data presentation sections 121 decreases or the lighting becomes dark. Further, for example, every time the operator depresses a predetermined button, an event in the content switches, and the devices relating to the stage effects such as acoustics, lighting, videos, or tactile stimuli can be collectively controlled on the real time basis in accordance with a program associated with the event after the switching. It is to be noted that, at this time, events different from each other may be allocated to different buttons.

Further, not only a user but also an operator can receive feedback of stage effects being experienced by the user by wearing a headphone for acoustic presentation and a sensation presentation device 100 for tactile presentation. It is to be noted that, a timekeeper who performs progress management may be deployed separately from the operator in the control booth such that the operator and the timekeeper perform a work cooperatively.

Although the preferred embodiment of the present disclosure has been described in detail with reference to the accompanying drawings, the technical scope of the present disclosure is not limited to such embodiment. It is apparent that a person who has common knowledge in the technical field to which the present disclosure pertains can conceive various alterations or modifications within the scope of the technical idea disclosed in the claims, and it is recognized that they naturally belong to the technical scope of the present disclosure.

Further, the advantageous effects described in the present specification are explanatory or exemplary to the last and not restrictive. In particular, the technology according to the present disclosure can demonstrate other advantageous effects that are apparent to those skilled in the art from the description of the present specification together with or in place of the effects described above.

It should be noted that the following configurations also fall within the technical scope of the present disclosure:

(1)

An information processing device, including:

a generation section that generates, on the basis of information regarding a first perception characteristic of a user with respect to a first sound emitted from an acoustic presentation section and information regarding a second perception characteristic of the user with respect to a second sound emitted by a tactile stimulus presented from a tactile data presentation section, tactile data to be used for presentation of the tactile stimulus of emitting the second sound that is not perceived by the user.

(2)

The information processing device according to (1) above, in which the generation section generates the tactile data by adjusting a ratio between the first sound and the second sound that reach an ear of the user on the basis of the information regarding the first perception characteristic and the information regarding the second perception characteristic.

(3)

The information processing device according to (2) above, in which the generation section generates the tactile data by adjusting the ratio for each frequency band on the basis of the information regarding the first perception characteristic and the information regarding the second perception characteristic.

(4)

The information processing device according to (3) above, in which the generation section decreases a sound pressure level of the second sound so as to be lower than that of the first sound in an audible range of the user.

(5)

The information processing device according to (3) above, in which,

In a case where the first sound is not emitted or in a case where the frequency band corresponding to the first sound is higher than a predetermined value, the generation section adjusts the frequency band corresponding to the second sound to an outside of the audible range or adjusts a sound pressure level of the second sound to a value lower than that of an audible level.

(6)

The information processing device according to (3) above, in which, in a case where the frequency band corresponding to the first sound is higher than a predetermined value or in a case where a difference between a frequency corresponding to a sound pressure level that is a peak of the first sound and another frequency corresponding to a sound pressure level that is a peak of the second sound is greater than a predetermined value, the generation section decreases the ratio of the second sound.

(7)

An information processing method to be executed by a computer, the method including:

generating, on the basis of information regarding a first perception characteristic of a user with respect to a first sound emitted from an acoustic presentation section and information regarding a second perception characteristic of the user with respect to a second sound emitted by a tactile stimulus presented from a tactile data presentation section, tactile data to be used for presentation of the tactile stimulus of emitting the second sound that is not perceived by the user.

(8)

A program for causing a computer to implement:

generating, on the basis of information regarding a first perception characteristic of a user with respect to a first sound emitted from an acoustic presentation section and information regarding a second perception characteristic of the user with respect to a second sound emitted by a tactile stimulus presented from a tactile data presentation section, tactile data to be used for presentation of the tactile stimulus of emitting the second sound that is not perceived by the user.

REFERENCE SIGNS LIST

100 Sensation presentation device
110 Control section
111 Tactile data processing section
112 Acoustic data processing section
120 Tactile presentation section
121 Tactile data presentation section
130 Sound presentation section
131 Acoustic data presentation section
140 Communication section
150 Sensor section
160 Storage section
200 Information processing device
210 Control section
220 Generation section
221 Tactile data generation section
222 Acoustic data generation section
223 Lighting data generation section
230 Communication section
240 Display section
250 Storage section
260 Controller
270 Audio IF
280 Amplifier
290 Front speaker
300 Projector
310 Screen
320 Light
330 Smoke generator
340 Wind generator

The invention claimed is:

1. An information processing device, comprising:
a processor configured to generate tactile data based on
information regarding a first perception characteristic of a user with respect to a first sound emitted from a speaker, and
information regarding a second perception characteristic of the user with respect to a second sound emitted by a tactile stimulus presented to the user from an actuator,
wherein the tactile data represents the tactile stimulus that emits the second sound not perceivable by the user.

2. The information processing device according to claim 1, wherein the processor is further configured to:
adjust a ratio between the first sound and the second sound that reach an ear of the user, based on the information regarding the first perception characteristic and the information regarding the second perception characteristic; and
generate the tactile data based on the adjusted ratio.

3. The information processing device according to claim 2, wherein the processor is further configured to:
adjust the ratio for a frequency band corresponding to the second sound based on the information regarding the first perception characteristic and the information regarding the second perception characteristic; and
generate the tactile data based on the adjusted ratio for the frequency band corresponding to the second sound.

4. The information processing device according to claim 3, wherein the processor is further configured to decrease a sound pressure level of the second sound so as to be lower than that of the first sound in an audible range of the user.

5. The information processing device according to claim 3, wherein the processor is further configured to adjust one of the frequency band corresponding to the second sound to an outside of an audible range of the user or a sound pressure level of the second sound to a value lower than that of an audible level, based on one of a frequency band corresponding to the first sound that is higher than a specific value or non-emission of the first sound.

6. The information processing device according to claim 3, wherein
the processor is further configured to decrease the ratio based on one of a frequency band corresponding to the first sound or a difference between a first frequency corresponding to a first sound pressure level that is a peak of the first sound and a second frequency corresponding to a second sound pressure level that is a peak of the second sound,
the frequency band corresponding to the first sound is higher than a first value, and
the difference is greater than a second value.

7. An information processing method, comprising:
in an information processing device that comprises a processor:
generating, by the processor, tactile data based on
information regarding a first perception characteristic of a user with respect to a first sound emitted from a speaker, and
information regarding a second perception characteristic of the user with respect to a second sound emitted by a tactile stimulus presented to the user from an actuator, wherein the tactile data represents the tactile stimulus that emits the second sound not perceivable by the user.

8. A non-transitory computer-readable medium having stored thereon computer-executable instructions which when executed by a processor, cause the processor to execute operations, the operations comprising:
  generating tactile data based on
    information regarding a first perception characteristic of a user with respect to a first sound emitted from a speaker, and
    information regarding a second perception characteristic of the user with respect to a second sound emitted by a tactile stimulus presented to the user from an actuator,
      wherein the tactile data represents the tactile stimulus that emits the second sound not perceivable by the user.

* * * * *